United States Patent
Byun et al.

(10) Patent No.: US 12,003,881 B2
(45) Date of Patent: Jun. 4, 2024

(54) ELECTRONIC DEVICE AND CONTROL METHOD OF ELECTRONIC DEVICE

(71) Applicant: Samsung Electronics Co., Ltd., Suwon-si (KR)

(72) Inventors: Dongnam Byun, Suwon-si (KR); Jongmyeong Ban, Suwon-si (KR); Hyechan Bae, Suwon-si (KR); Seongwoo Oh, Suwon-si (KR); Jaeyeop Lee, Suwon-si (KR); Haedong Yeo, Suwon-si (KR); Jinyoung Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/993,280

(22) Filed: Nov. 23, 2022

(65) Prior Publication Data
US 2023/0082407 A1  Mar. 16, 2023

Related U.S. Application Data

(63) Continuation of application No. PCT/KR2021/005021, filed on Apr. 21, 2021.

(30) Foreign Application Priority Data

Jun. 10, 2020  (KR) .................. 10-2020-0070562
Jul. 9, 2020   (KR) .................. 10-2020-0084909

(51) Int. Cl.
  *G06T 7/00*    (2017.01)
  *G06T 1/00*    (2006.01)
  *G11B 27/036*  (2006.01)
  *G11B 27/10*   (2006.01)
  (Continued)

(52) U.S. Cl.
CPC ........... *H04N 5/265* (2013.01); *G06T 7/0002* (2013.01); *G11B 27/036* (2013.01); *G11B 27/10* (2013.01);
(Continued)

(58) Field of Classification Search
CPC .......... G06T 7/00; G06T 1/00; G11B 27/036; G11B 27/10; G11B 27/00; G11B 27/02; H04N 23/66; H04N 5/265; H04N 5/91
(Continued)

(56) References Cited

U.S. PATENT DOCUMENTS 5,523,852 A   6/1996   Sowerby et al.
9,792,955 B2  10/2017  Fleischhauer et al.
(Continued)

FOREIGN PATENT DOCUMENTS

JP   2005-286377 A   10/2005
JP   2018-026875 A   2/2018
(Continued)

*Primary Examiner* — Daquan Zhao
(74) *Attorney, Agent, or Firm* — Jefferson IP Law, LLP

(57) ABSTRACT

An electronic device and a control method thereof are provided. The control method of an electronic device includes the steps of when a user command for initiating video recording is received, transmitting, to an external device connected to the electronic device, a first signal including a request for initiating video recording, acquiring a first image according to the user command, acquiring a first score for composition of the first image by using a trained neural network model, when a second signal including a second score for composition of a second image acquired by the external device is received according to the first signal, identifying, from the second image, at least one merging section to be merged into the first image, on the basis of the first score and the second score, transmitting, to the external device, a third signal including a request for image data corresponding to the at least one merging section, and when a fourth signal including the image data is received according to the third signal, acquiring a third image by merging an image corresponding to the at least one merging section into the first image on the basis of the image data.

15 Claims, 15 Drawing Sheets

(51) Int. Cl.
*H04N 5/265* (2006.01)
*H04N 5/91* (2006.01)
*H04N 23/66* (2023.01)

(52) U.S. Cl.
CPC ............... *H04N 5/91* (2013.01); *H04N 23/66* (2023.01); *G06T 2207/20084* (2013.01); *G06T 2207/30168* (2013.01)

(58) Field of Classification Search
USPC ....... 386/223, 278, 280, 282, 286, 200, 201, 386/239, 248, 291
See application file for complete search history.

(56) References Cited

U.S. PATENT DOCUMENTS

| | | |
|---|---|---|
| 10,037,467 B2 | 7/2018 | Kitano |
| 10,511,765 B2 | 12/2019 | Kim et al. |
| 2015/0063778 A1* | 3/2015 | Kwon .................... H04N 23/62 348/207.11 |
| 2016/0366334 A1 | 12/2016 | Kim et al. |
| 2019/0228231 A1 | 7/2019 | Tandon et al. |
| 2020/0051300 A1* | 2/2020 | Shah .................... G06V 40/175 |
| 2020/0160056 A1* | 5/2020 | Agarwal ................ G06V 20/10 |

FOREIGN PATENT DOCUMENTS

| | | |
|---|---|---|
| KR | 10-0317094 B1 | 2/2002 |
| KR | 10-0629442 B1 | 9/2006 |
| KR | 10-2015-0027934 A | 3/2015 |
| KR | 10-2016-0145438 A | 12/2016 |
| KR | 10-1814714 B1 | 1/2018 |
| KR | 10-2019-0044761 A | 5/2019 |
| KR | 10-2054116 B1 | 12/2019 |
| KR | 10-2020-0063329 A | 6/2020 |

\* cited by examiner

ELECTRONIC DEVICE AND CONTROL METHOD OF ELECTRONIC DEVICE

CROSS-REFERENCE TO RELATED APPLICATION(S)

This application is a continuation application, claiming priority under § 365(c), of an International application No. PCT/KR2021/005021, filed on Apr. 21, 2021, which is based on and claims the benefit of a Korean patent application number 10-2020-0070562, filed on Jun. 10, 2020, in the Korean Intellectual Property Office, and of a Korean patent application number 10-2020-0084909, filed on Jul. 9, 2020, in the Korean Intellectual Property Office, the disclosure of each of which is incorporated by reference herein in its entirety.

BACKGROUND

1. Field

The disclosure relates to an electronic device and a control method of the electronic device. More particularly, the disclosure relates to an electronic device capable of automatically extracting and merging sections having good compositions from a plurality of images recorded by a plurality of devices and a control method thereof.

2. Description of Related Art

Recently, with the development of social media, the number of users who produce video contents is rapidly increasing. In particular, the number of users who want to produce high-quality image contents by merging images recorded by a plurality of devices for one scene into one image is also increasing.

However, when a user directly identifies desired sections from a plurality of images, respectively, and merges the identified sections, this not only causes inconvenience from a user's point of view, but may also require a lot of effort and time for the user to master a method of utilizing an application for merging images. In addition, even if a user succeeds in merging a plurality of images by overcoming inconvenience and difficulty in merging images, there is a problem in that an aesthetic quality of an image obtained by merging the images is not guaranteed.

Therefore, there is a need for a technology capable of acquiring a plurality of images through a plurality of devices, and automatically merging the acquired images to provide a high-quality image, simply by a user inputting a user command for initiating video recording.

The above information is provided as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic device capable of automatically extracting and merging sections having good compositions from a plurality of images recorded by a plurality of devices and a control method thereof.

Additional aspects will be set forth in part in the description which follows and, in part, will be apparent from the description, or may be learned by practice of the presented embodiments.

In accordance with an aspect of the disclosure, an electronic device is provided. The electronic device includes a camera, a communication unit including a circuit, a memory configured to store at least one instruction, and at least one processor configured to execute the at least one instruction, wherein the at least one processor is configured to, by executing the at least one instruction when a user command for initiating video recording is received, control the communication unit to transmit a first signal including a request for initiating video recording to an external device connected to the electronic device, acquire a first image through the camera according to the user command, acquire a first score for a composition of the first image using a trained neural network model, when a second signal including a second score for a composition of a second image acquired by the external device is received from the external device through the communication unit according to the first signal, identify at least one merging section to be merged into the first image from the second image on the basis of the first score and the second score, control the communication unit to transmit a third signal including a request for image data corresponding to the at least one merging section to the external device, and when a fourth signal including the image data is received from the external device through the communication unit according to the third signal, acquire a third image by merging an image corresponding to the at least one merging section into the first image on the basis of the image data.

The first score may be an average value of scores for at least some of a plurality of frames included in a main section of the first image, the main section of the first image may be at least one of a plurality of sections of the first image in which an average value of scores for at least some frames included in each of the plurality of sections is equal to or greater than a preset threshold value, the second score may be an average value of scores for at least some of a plurality of frames included in a main section of the second image, and the main section of the second image may be at least one of a plurality of sections of the second image in which an average value of scores for at least some frames included in each of the plurality of sections is equal to or greater than the preset threshold value.

The at least one processor may be configured to acquire first time information on a start time point and an end time point of each of main sections of the first image, on the basis of the first time information and second time information on a start time point and an end time point of each of main sections of the second image included in the second signal, identify a section overlapping a main section of the first image among the main sections of the second image, and identify, as the at least one merging section, a section overlapping a main section of the first image and having a higher score than the main section of the first image among the main sections of the second image, and a section that does not overlap the main sections of the first image among the main sections of the second image.

The at least one processor may be configured to, while a plurality of frames of the first image are acquired, input at least some of the plurality of frames of the first image to the neural network model at a preset frame interval and acquire scores for the at least some of the plurality of frames of the first image.

The request for initiating video recording includes time code information for synchronizing system times of the electronic device and the external device with each other.

The second score may be received from the external device through the communication unit as a fifth signal including a request for terminating the initiated video recording is transmitted to the external device through the communication unit.

The second score may be acquired using a neural network model included in the external device.

In accordance with another aspect of the disclosure, a control method of an electronic device is provided. The control method includes when a user command for initiating video recording is received, transmitting a first signal including a request for initiating video recording to an external device connected to the electronic device, acquiring a first image according to the user command, acquiring a first score for a composition of the first image using a trained neural network model, when a second signal including a second score for a composition of a second image acquired by the external device is received according to the first signal, identifying at least one merging section to be merged into the first image from the second image on the basis of the first score and the second score, transmitting a third signal including a request for image data corresponding to the at least one merging section to the external device, and when a fourth signal including the image data is received according to the third signal, acquiring a third image by merging an image corresponding to the at least one merging section into the first image on the basis of the image data.

The first score may be an average value of scores for at least some of a plurality of frames included in a main section of the first image, the main section of the first image may be at least one of a plurality of sections of the first image in which an average value of scores for at least some frames included in each of the plurality of sections is equal to or greater than a preset threshold value, the second score may be an average value of scores for at least some of a plurality of frames included in a main section of the second image, and the main section of the second image may be at least one of a plurality of sections of the second image in which an average value of scores for at least some frames included in each of the plurality of sections is equal to or greater than the preset threshold value.

The identifying of the at least one merging section may include acquiring first time information on a start time point and an end time point of each of main sections of the first image, on the basis of the first time information and second time information on a start time point and an end time point of each of main sections of the second image included in the second signal, identifying a section overlapping a main section of the first image among the main sections of the second image, and identifying, as the at least one merging section, a section overlapping a main section of the first image and having a higher score than the main section of the first image among the main sections of the second image, and a section that does not overlap the main sections of the first image among the main sections of the second image.

The acquiring of the first score may include while a plurality of frames of the first image are acquired, inputting at least some of the plurality of frames of the first image to the neural network model at a preset frame interval and acquiring scores for the at least some of the plurality of frames of the first image.

The request for initiating video recording includes time code information for synchronizing system times of the electronic device and the external device with each other.

The second score may be received from the external device as a fifth signal including a request for terminating the initiated video recording is transmitted.

The second score may be acquired using a neural network model included in the external device.

In accordance with another aspect of the disclosure, a non-transitory computer-readable recording medium is provided. The non-transitory includes a program for executing a control method of an electronic device, the control method of the electronic device including when a user command for initiating video recording is received, transmitting a first signal including a request for initiating video recording to an external device connected to the electronic device, acquiring a first image according to the user command, acquiring a first score for a composition of the first image using a trained neural network model, when a second signal including a second score for a composition of a second image acquired by the external device is received according to the first signal, identifying at least one merging section to be merged into the first image from the second image on the basis of the first score and the second score, transmitting a third signal including a request for image data corresponding to the at least one merging section to the external device, and when a fourth signal including the image data is received according to the third signal, acquiring a third image by merging an image corresponding to the at least one merging section into the first image on the basis of the image data.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
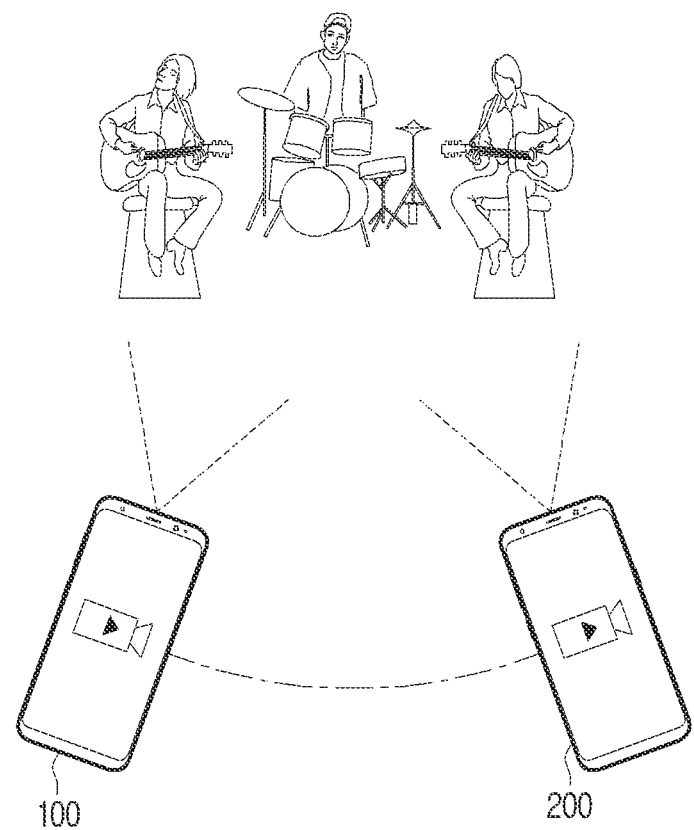
FIG. 1 is a conceptual diagram illustrating a recording process of an electronic device and an external device according to an embodiment of the disclosure.

The following description with reference to the accompanying drawings is provided to assist in a comprehensive understanding of various embodiments of the disclosure defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the disclosure, the expression such as "have", "may have", "include", or "may include" indicates presence of a corresponding feature (e.g., a numerical value, a function, an operation, or a component such as a part), and does not preclude presence of an additional feature.

In the disclosure, the expression "A or B", "at least one of A and/or B", or "one or more of A and/or B" may include all possible combinations of the items that are enumerated together. For example, the expression "A or B", "at least one of A and B", or "at least one of A or B" may refer to any of (1) at least one A, (2) at least one B, or (3) both at least one A and at least one B.

In addition, the expressions "1st", "2nd", "first", "second", and the like used in the disclosure may be used to modify various components regardless of the order and/or the importance and to distinguish one component from another component, but do not limit the components.

Further, it should be understood that when one component (e.g., a first component) is referred to as being "(operatively or communicatively) coupled with/to" or "connected to" another component (e.g., a second component), the one component may be coupled with/to or connected to the another component either in a direct manner or through an intervening component (e.g., a third component).

On the other hand, it should be understood that when one component (e.g., a first component) is referred to as being "directly coupled with/to" or "directly connected to" another component (e.g., a second component), there is no intervening component (e.g., a third component) between the one component and the another component.

Additionally, the expression "configured to (or set to)" used in the disclosure may be interchangeably used with, for example, "suitable for", "having the capacity to", "designed to", "adapted to", "made to", or "capable of", depending on circumstances. The term "configured to (or set to)" does not necessarily refer to "specifically designed to" in terms of hardware.

Instead, under certain circumstances, the expression "a device configured to" may refer to a device "capable of" doing something together with another device or another part. For example, the phrase "a processor configured to (or set to) perform A, B, and C" may refer to a dedicated processor (e.g., an embedded processor) for performing the corresponding operations, or a generic-purpose processor (e.g., a central processing unit (CPU) or an application processor) capable of performing the corresponding operations by executing one or more software programs stored in a memory device.

In an embodiment, a "module" or a "unit" performs at least one function or operation, and may be implemented as hardware, software, or a combination of hardware and software. In addition, a plurality of "modules" or a plurality of "units" may be integrated into at least one module and implemented as at least one processor, except for a "module" or a "unit" that needs to be implemented as specific hardware.

Various elements and areas in the drawings are schematically illustrated. Therefore, the technical idea of the disclosure is not limited by relative sizes or intervals illustrated in the accompanying drawings.

An electronic device according to various embodiments of the disclosure may include, for example, at least one of a smartphone, a tablet personal computer (PC), a desktop PC, a laptop PC, or a wearable device. The wearable device may include at least one of an accessory-type device (e.g., a watch, a ring, a bracelet, an ankle bracelet, a necklace, glasses, a contact lens, or a head-mounted device (HMD)), a device integrated with fabrics or clothing (e.g., electronic clothing), a body-attached device (e.g., a skin pad or a tattoo), or an implantable circuit.

In some embodiments, an electronic device may include at least one of, for example, a television (TV), a digital video disc (DVD) player, an audio, a refrigerator, an air conditioner, a cleaner, an oven, a microwave oven, a washing machine, an air cleaner, a set-top box, a home automation control panel, a security control panel, a media box (e.g., Samsung HomeSync™, Apple TV™, or Google TV™), a game console (e.g., Xbox™ or PlayStation™), an electronic dictionary, an electronic key, a camcorder, an electronic photo frame, and the like.

In other embodiments, an electronic device may include at least one of any kind of medical device (e.g., any kind of portable medical measurement device (such as a blood glucose meter, a heart rate meter, a blood pressure meter, or a body temperature meter), a magnetic resonance angiography (MRA) device, a magnetic resonance imaging (MRI) device, a computed tomography (CT) device, a photographing device, or an ultrasonic device), a navigation device, a global navigation satellite system (GNSS), an event data recorder (EDR), a flight data recorder (FDR), an automobile infotainment device, electronic equipment for a ship (e.g., a navigation device for a ship or a gyro compass), avionics, a security device, an automobile head unit, an industrial or household robot, a drone, an automated teller machine (ATM) for a financial institute, a point of sales (POS) for a shop, or an Internet of things (IoT) device (e.g., a light bulb, any kind of sensor, a sprinkler system, a fire alarm, a thermostat, a street light, a toaster, exercise equipment, a hot water tank, a heater, or a boiler).

Hereinafter, embodiments according to the disclosure will be described in detail with reference to the accompanying drawings so that the embodiments may be easily carried out by those having ordinary knowledge in the art to which the disclosure pertains.

FIG. 1 is a conceptual diagram illustrating a recording process of an electronic device 100 and an external device 200 according to an embodiment of the disclosure.

Prior to describing various embodiments according to the disclosure, main concepts used in describing the disclosure will be described with reference to FIG. 1. The "electronic device 100" and the "external device 200" according to the disclosure may be implemented by smartphones, tablet PCs, digital cameras, and the like. However, the electronic device 100 and the external device 200 according to the disclosure are not limited to specific types of devices.

Referring to FIG. 1, an electronic device 100 and an external device 200 according to the disclosure may record a same scene. Specifically, the electronic device 100 may acquire a first image by initiating video recording through a camera included in the electronic device 100, and the external device 200 may acquire a second image by initiating video recording through a camera of the external device 200 while the first image is acquired by the electronic device 100.

More specifically, the electronic device 100 and the external device 200 may acquire a first image and a second image, which are different images for the same scene, respectively, on the basis of a user command input to the electronic device 100. The first image and the second image being different from each other means that the first image and the second image are different from each other in composition, and does not mean that the first image and the second image are different from each other in hardware or software performance such as image quality.

If the electronic device 100 and the external device 200 are different from each other in hardware or software, the recording conditions of the electronic device 100 and the external device 200 may be set to be unified based on the hardware or software having lower performance prior to initiating video recording. This is to prevent a sense of heterogeneity that may occur when a new image is acquired by merging the first image and the second image as will be described below. In an embodiment, a time of the first image and a time of the second image may be synchronized with each other as will be described below, and consequently, the first image and the second image may be images having different compositions for the same scene of the same time.

In another embodiment, in describing the disclosure, "a score related to the composition of the image" refers to a value quantitatively indicating an aesthetic quality for the composition of the image. Specifically, the score related to the composition of the image may indicate a degree of stability or aesthetic depending on how much objects are arranged in an associated manner in the image. In describing the disclosure, the term "score" may be replaced with the term "score information". In yet another embodiment, the score may be acquired not only in units of one frame constituting an image but also based on a partial section of the image or the entire image. When the score is acquired based on a partial section of the image or the entire image, the score may be acquired by calculating an average of scores for at least some frames included in the partial section of the image or the entire image.

In an embodiment, in the disclosure, the electronic device 100 and the external device 200 are identical in that an image is recorded through a camera and a score related to the composition of the image is acquired using a trained neural network model, but are different in that whether or not the device receives user commands for initiating and terminating video recording and merges a plurality of images. The electronic device 100, which is a so-called master device, may receive user commands for initiating and terminating video recording, and may generate a new image in which a plurality of images are merged by receiving image data from the external device 200, which may be referred to as a so-called slave device.

Hereinafter, each step of a control method according to the disclosure will be described with reference to FIG. 2.

Figure 2:
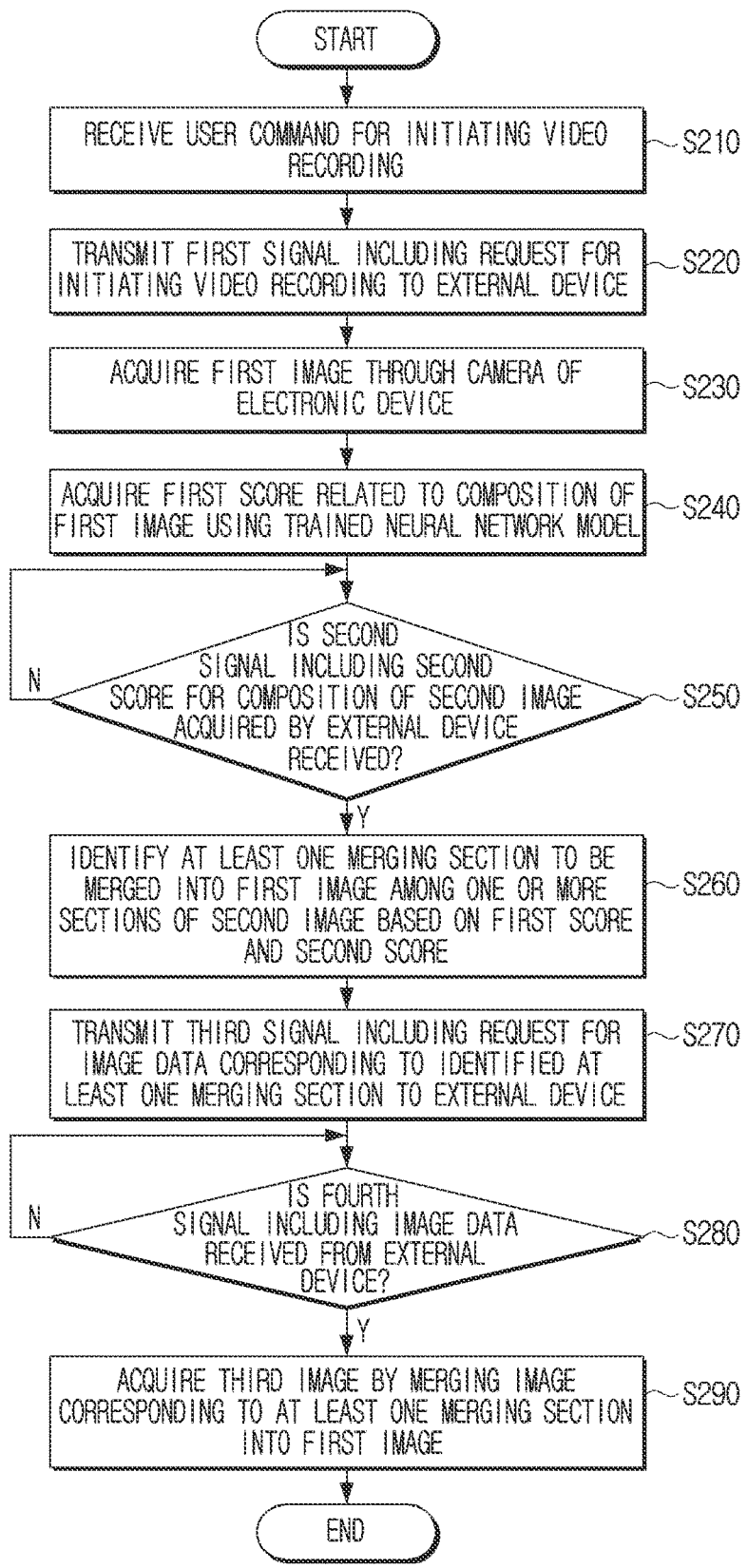
FIG. 2 is a flowchart briefly illustrating a control method of the electronic device according to an embodiment of the disclosure.

FIG. 2 is a flowchart briefly illustrating a control method of the electronic device 100 according to an embodiment of the disclosure.

Referring FIG. 2, an electronic device 100 may receive a user command for initiating video recording in operation S210. The user command for initiating video recording may be received on a basis of a user touch input through a display of the electronic device 100, a user voice received through a microphone of the electronic device 100, an input of a physical button provided in the electronic device 100, a control signal transmitted by a remote control device for controlling the electronic device 100, or the like.

In an embodiment, when receiving the user command for initiating video recording, the electronic device 100 may transmit a first signal including a request for initiating video recording to the external device 200 connected to the electronic device 100 in operation S220. The electronic device 100 and the external device 200 being "connected" to each other means that communication connection is established between the electronic device 100 and the external device 200 as a result of exchange between a request and a response for communication connection. The communication connection according to the disclosure may be made in a wired manner or in a wireless manner, and the specific communication method is not particular limited.

In another embodiment, the request for initiating video recording may include a request for the electronic device 100 and the external device 200 to simultaneously initiate video recording. However, the electronic device 100 and the external device 200 according to the disclosure do not necessarily need to initiate video recording at the physically same time. The request for initiating video recording may include time code information, and the electronic device 100 and the external device 200 may synchronize their system times on the basis of the time code information. Accordingly, times of images recorded by the electronic device 100 and the external device 200 may be synchronized with each other.

In yet another embodiment, the electronic device 100 may acquire a first image through the camera according to the user command in operation S230. When receiving the user command for initiating video recording, the electronic device 100 may not only transmit a first signal including a request for initiating video recording to the external device 200, but also acquire a first image by initiating video recording through the camera of the electronic device 100.

In still another embodiment, as described above, while the first image is acquired by the electronic device 100, the external device 200 may acquire a second image by initiating video recording through the camera of the external device 200 on the basis of the first signal, and the first image and the second image may be images having different compositions for the same scene of the same time.

When acquiring the first image, the electronic device 100 may acquire a first score related to the composition of the first image using a trained neural network model in operation S240. The "first score" refers to an average value of scores for at least some of a plurality of frames included in a main section of the first image. In addition, the "main section of the first image" refers to at least one of a plurality of sections of the first image in which an average value of scores for at least some frames included in each of the plurality of sections is equal to or greater than a preset threshold value. In particular, a size of the main section of the first image may be variable. A process of identifying a main section according to the disclosure will be described in more detail with reference to FIG. 5.

In an embodiment, the score may be acquired using a trained neural network model, and specifically, may be acquired in various ways according to the types of neural network models to be described below. In particular, image data corresponding to one frame included in the image is input to the neural network model, and a score for the input frame may be acquired. However, for convenience of description, an input to the neural network model will hereinafter be simply referred to as an "image" if possible.

First, the electronic device 100 may acquire a score using a first neural network model trained to output a score for a composition of an image. Specifically, the electronic device 100 may input an image to the first neural network model and acquire a score for a composition of the input image.

The first neural network model may be a so-called aesthetic model. The aesthetic model may output a score indicating how similar the composition of the input image is to a composition of a training data image evaluated by experts.

In an embodiment, while a plurality of frames of the first image are acquired, the electronic device 100 may input at least some of the plurality of frames of the first image to the first neural network model at a preset frame interval, and acquire scores for the at least some of the plurality of frames of the first image. The electronic device 100 may acquire scores for at least some of the plurality of frames of the first image by inputting at least some of the plurality of frames of the first image to the first neural network model while the plurality of frames of the first image are acquired, rather than inputting the frames of the first image to the first neural network model after recording of the first image is terminated. The electronic device 100 may acquire scores for at least some of the plurality of frames of the first image by inputting acquired frames to the first neural network model in real time whenever the frames are acquired at a preset frame interval.

Secondly, the electronic device 100 may acquire a score using a second neural network model trained to output information on a position of an object included in an image. Specifically, the electronic device 100 may input an image to the second neural network model, acquire information on a position of an object included in the input image, and acquire a score on the basis of a predefined rule related to whether the object is positioned in a good composition within the image.

The second neural network model may be an object detection model, a salient object detection model or a saliency model, or an object segmentation model. In an embodiment, the object detection model may output information on a position of an object included in the input image, e.g., information on a bounding box corresponding to the position of the object included in the input image. In addition, the salient object detection model or the saliency model may output information on a saliency map indicating a salient object included in the input image distinguishably from an area surrounding the salient object using a visual attention mechanism. Also, the object segmentation model may output information on an area of an object corresponding to a shape of the object included in the input image.

Thirdly, the electronic device 100 may acquire a score using a third neural network model trained to output information on a position of an object included in an image together with information on the type of object. Specifically, the electronic device 100 may acquire information on a position of an object and information on the type of object using the third neural network model, and acquire a score on the basis of a predefined rule related to whether the object is positioned in a good composition in the image.

The third neural network model may be a so-called object recognition model. The object recognition model may not only output information on a position of an object like the above-described object detection model, but also classify the detected object and output information on the type of object.

In another embodiment, the predefined rule applied after using the second neural network model or the third neural network model may include at least one of various rules, such as whether the object is positioned at intersections where the image is horizontally divided into three parts and vertically divided into three parts (a so-called rule of thirds), whether the object is positioned at the center of the image, and whether the image satisfies symmetry. Furthermore, various rules, such as whether the type of object is classified as a person, whether a space between the person and the uppermost end of the image (a so-called head room) is appropriate when the type of object is classified as the person, whether a vanishing point exists in the image, whether a horizontal line exists horizontally in the image, and whether a horizontal line exists at an appropriate position in the image, may be added to the predefined rule.

A process of acquiring a score related to a composition of an image using a neural network model and a predefined rule related to whether an object is positioned in a good composition within the image according to the disclosure will be described in more detail with reference to FIGS. 3, and 4A to 4E.

In an embodiment, when receiving a second signal including a second score related to a composition of a second image acquired by an external device 200 according to a first signal from the external device 200 in operation S250—Y, an electronic device 100 may identify at least one merging section to be merged into a first image from the second image on a basis of a first score and a second score in operation S260.

As described above, while the first score for the composition of the first image is acquired by the electronic device 100, the external device 200 may acquire a second score for a composition of a second image using a neural network model included in the external device 200, and transmit the acquired second score to the electronic device 100. In another embodiment, the electronic device 100 may acquire the second score by receiving the second score from the external device 200. In particular, the second score may be transmitted from the external device 200 to the electronic device 100, as a fifth signal including a request for terminating the previously initiated video recording is transmitted from the electronic device 100 to the external device 200.

The "second score" refers to an average value of scores for at least some of a plurality of frames included in a main section of the second image. In addition, the "main section of the second image" refers to at least one of a plurality of sections of the second image in which an average value of scores for at least some frames included in each of the plurality of sections is equal to or greater than a preset threshold value. In particular, a size of the main section of the second image may be variable. A process of identifying a main section according to the disclosure will be described in more detail with reference to FIG. 5. In yet an embodiment, a neural network model included in the external device 200 and a process of acquiring a second score using the neural network model are the same as the neural network model included in the electronic device 100 and the process of acquiring the first score using the neural network model, and therefore, the description thereof will not be repeated.

In an embodiment, a process of identifying at least one merging section to be merged into the first image from the second image on the basis of the first score and the second score may be performed by the electronic device 100 as will be described below. In describing the disclosure, the term "merging section" is used to specify a section merged into the first image among main sections of the second image, distinguishably from the term "main section".

First, the electronic device 100 may acquire "first time information" on a start time point and an end time point of each main section of the first image. In particular, the first time information may be acquired as metadata for the first image while the first image is acquired by the electronic device 100. In another embodiment, the electronic device 100 may receive "second time information" on a start time point and an end time point of each main section of the second image from the external device 200. In yet another embodiment, the second time information may be acquired as metadata for the second image while the second image is acquired by the external device 200, and may be included in the second signal such that the electronic device 100 receives the second time information included in the second signal transmitted from the external device 200.

In an embodiment, when acquiring the first time information and the second time information, the electronic device 100 may identify a section overlapping a main section of the first image among the main sections of the second image on the basis of the first time information and the second time information. The section "overlapping" a main section of the first image among the main sections of the second image refers to at least one among the main sections of the second image overlapping at least one of among the main sections of the first image. For example, if section A among the main sections of the first image is a section of "0:05 to 0:10" (this indicates that a start time point of the section A is a point at which 0 minutes and 5 seconds have elapsed from the start of the image, and an end time point of the section A is a point at which 0 minutes and 10 seconds have elapsed from the start of the image, and the other sections will be expressed in the same manner below) and section B among the main sections of the second image is a section of "0:07 to 0:15", the two sections may be considered as sections overlapping each other.

In another embodiment, when identifying sections overlapping main sections of the first image among the main sections of the second image, the electronic device 100 may identify, as at least one merging section to be merged into the first image, a section overlapping a main section of the first image and having a higher score than the main section of the first image among the main sections of the second image, and a section that does not overlap the main sections of the first image among the main sections of the second image.

Specifically, in the above-described example, if a first score for the section A is "0.8" and a second score for the section B is "0.9", the electronic device 100 may identify the section B as at least one merging section to be merged into the first image. In addition, if section C among the main sections of the second image is a section of "0:30 to 0:40" and the first image does not have a main section overlapping the section C, the electronic device 100 may also identify the section C, together with the section B, as at least one merging section to be merged into the first image. A process of identifying a merging section according to the disclosure will be described in more detail with reference to FIG. 6.

An electronic device 100 may transmit a third signal including a request for image data corresponding to the identified at least one merging section to an external device 200 in operation S270. Then, when receiving a fourth signal including an image data corresponding to at least one merging section from the external device 200 according to a third signal in operation S280—Y, an electronic device 100 may acquire a third image by merging an image corresponding to the at least one merging section into the first image in operation S290.

Specifically, the electronic device 100 may insert an image corresponding to the at least one merging section into a section of the first image corresponding to the at least one merging section to generate a third image in which the image corresponding to the at least one merging section is merged into the first image. The section of the first image "corresponding" to the at least one merging section refers to a section of the first image having the same start time point and the same end time point as each of the at least one merging section. In the disclosure, the term "merge" may be replaced with another term such as "edit" or "synthesize".

In the above-described example, the electronic device 100 may transmit a third signal including a request for image data corresponding to the sections B and C to the external device 200. In an embodiment, when receiving the third signal, the external device 200 may transmit a fourth signal including the image data corresponding to the sections B and C to the electronic device 100. Furthermore, when receiving the fourth signal, the electronic device 100 may acquire a third image by merging images corresponding to the sections B and C into the first image on the basis of the image data corresponding to the sections B and C.

In another embodiment, the electronic device 100 may not only simply merge an image corresponding to at least one merging section into the first image, but also apply a fade-in or fade-out effect or the like to a boundary section between the first image and the image merged into the first image.

Although various embodiments of the disclosure have been described above on the premise that the electronic device 100 is connected to one external device 200, the electronic device 100 may be connected to a plurality of external devices 200 according to the disclosure. An embodiment for a case in which a plurality of external devices 200 are included will be described in detail with reference to FIGS. 7A, 7B, and 8.

In yet another embodiment, the electronic device 100 and the external device 200 have been described above on the premise that a first score and a second score are acquired using neural network models included in the electronic device 100 and the external device 200, respectively, but the disclosure is not limited thereto. According to an embodiment, when the external device 200 transmits a second image itself to the electronic device 100, the electronic device 100 may acquire a second score for the second image using a neural network model.

According to various embodiments of the disclosure as described above, the electronic device 100 may acquire a new image by automatically merging sections having good compositions in a plurality of images recorded by a plurality of devices, and accordingly, it is possible to provide remarkable user convenience.

In a case where the neural network models according to the disclosure are implemented in an on-device form, scores for compositions of respective images may be acquired using the neural network models included in the electronic device 100 and the external device 200 without having to transmit a plurality of recorded images to an external server, and the plurality of images may be merged together based thereon. According to the disclosure, security related to user privacy may be secured together with user convenience.

According to the disclosure, an image is merged by receiving image data corresponding to only a merging section identified by the electronic device 100 from the external device 200, rather than merging an image by receiving image data corresponding to the entire second image from the external device 200. Therefore, it is possible to efficiently transmit or receive an image between the plurality of devices and efficiently use a storage space.

Hereinafter, each step of the control method as described above with reference to FIGS. 1 and 2 will be described in more detail with reference to FIGS. 3, 4A to 4E, 5, and 6.

Figure 3:
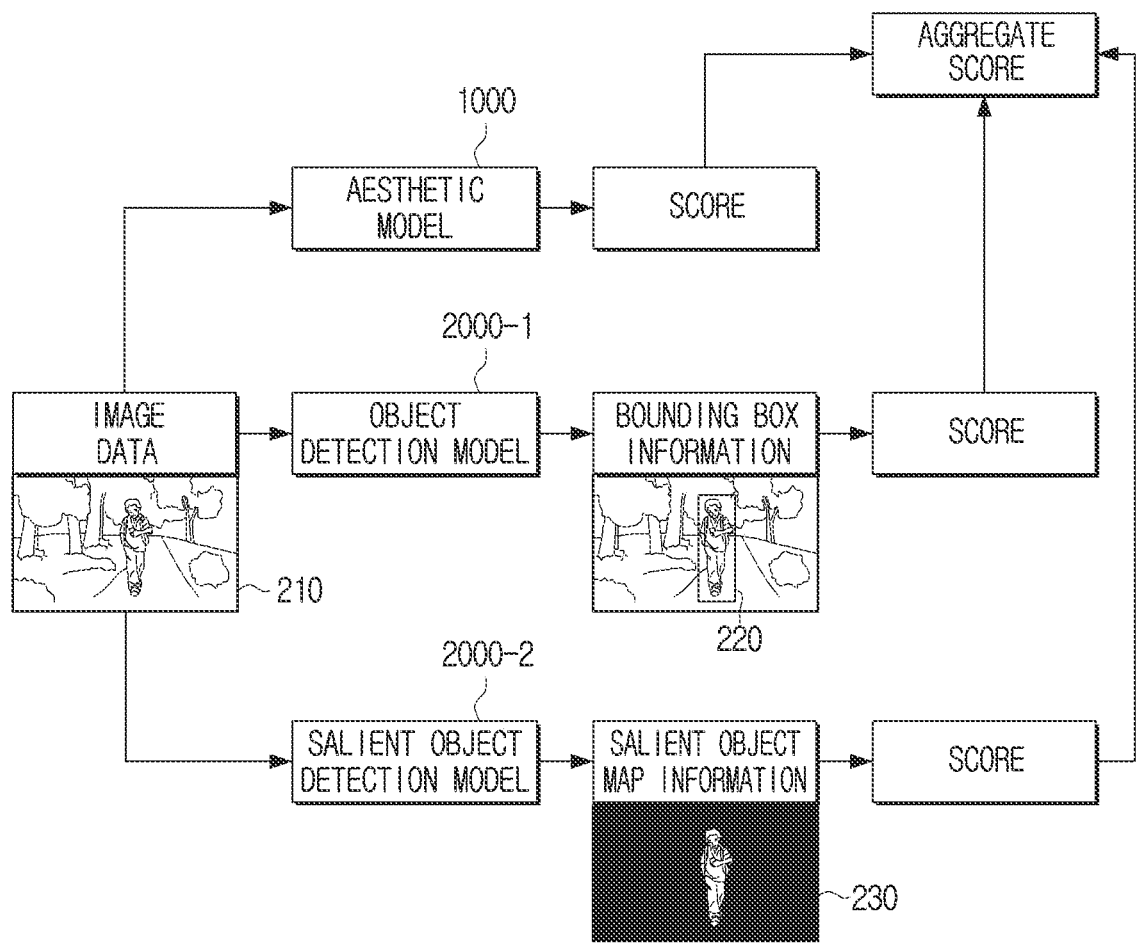
FIG. 3 is a diagram for specifically explaining a process of acquiring a score related to a composition of an image using a neural network model according to an embodiment of the disclosure.

FIG. 3 is a diagram for specifically explaining a process of acquiring a score related to a composition of an image using a neural network model according to an embodiment of the disclosure. FIGS. 4A to 4E are diagrams each for specifically explaining a predefined rule related to whether an object is positioned in a good composition within the image according to various embodiments of the disclosure. That is, FIGS. 3, and 4A to 4E are diagrams for explaining operation S240 of FIG. 2 in more detail.

As described above, the neural network models according to the disclosure may include a first neural network model trained to output a score for a composition of an image, a second neural network model trained to output information on a position of an object included in an image, and a third neural network model trained to output information on a position of an object included in an image together with information on the type of object.

In an embodiment, on the premise that the same image data corresponding to a frame of the same time point is input to an aesthetic model 1000, an object detection model 2000-1, and a salient object detection model or a saliency model 2000-2 among the neural network models according to the disclosure in FIG. 2, information output by each of the neural network models and a process of acquiring a score on the basis of the information according to the disclosure will be described in detail. The image data input to the neural network models may include information on a horizontal length of the image, a vertical length of the image, and an RGB value for each pixel of the image.

In another embodiment, the aesthetic model 1000 refers to a neural network model trained to output a score indicating how similar the composition of the input image is to a composition of a training data image, and is an example of the first neural network model according to the disclosure. As illustrated in FIG. 2, when image data is input to the aesthetic model 1000, the aesthetic model 1000 may compare the input image data with training data including information on a plurality of images evaluated as good in composition by experts, and output a score indicating an aesthetic quality for the composition of the input image.

In yet another embodiment, the object detection model 2000-1 is an example of the second neural network model according to the disclosure. The object detection model 2000-1 refers to a neural network model trained to output information on a position of an object included in an input image. As illustrated in FIG. 2, when image data 210 is input to the object detection model 2000-1, the object detection model 2000-1 may output, as information on a position of an object included in an input image, information on a bounding box 220 corresponding to the position of the object included in the input image.

In an embodiment, the salient object detection model 2000-2 is an example of the second neural network model according to the disclosure. The salient object detection model 2000-2 may output information on a saliency map indicating a salient object included in the input image distinguishably from an area surrounding the salient object using a visual attention mechanism. As illustrated in FIG. 2, when image data 230 is input to the salient object detection model 2000-2, the salient object detection model 2000-2 may output information on a saliency map 240 indicating a salient object included in the input image distinguishably from an area surrounding the salient object.

Meanwhile, as described above, the aesthetic model 1000 may output a score itself, and accordingly, the electronic device 100 may acquire a score related to a composition of an input image. On the other hand, the object detection model 2000-1 or the salient object detection model 2000-2 may output information on a position of an object rather than a score itself. In order to acquire a score related to a composition of an input image, the object detection model 2000-1 or the salient object detection model 2000-2 needs to accompany a process of applying a predefined rule related to whether the object is positioned in a good composition within the image.

When acquiring information on the position of the object through the object detection model 2000-1 or the salient object detection model 2000-2, the electronic device 100 may acquire a score by applying the predefined rule related to whether the object is positioned in a good composition within the image. Hereinafter, examples of predefined rules related to whether an object is positioned in a good composition within the image will be described with reference to FIGS. 4A to 4E.

Figure 4A:
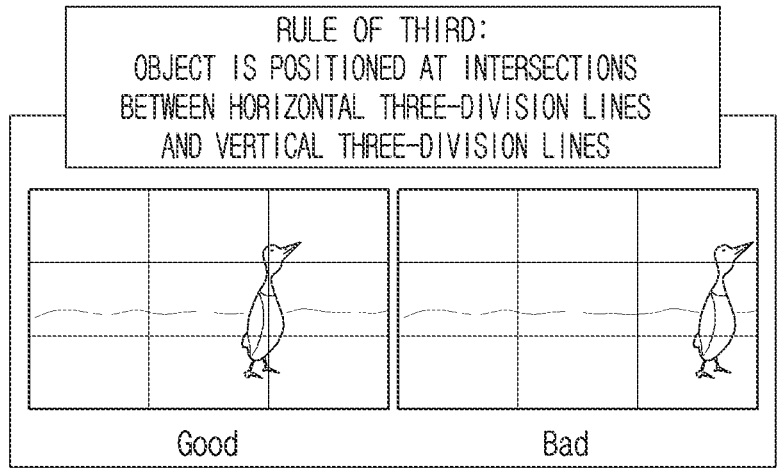
FIGS. 4A, 4B, 4C, 4D, and 4E are diagrams each for specifically explaining a predefined rule related to whether an object is positioned in a good composition within the image according to various embodiments of the disclosure.

FIG. 4A is a diagram for explaining a rule of thirds. Referring to FIG. 4A, an object in a left image is positioned at intersections where an image is horizontally divided into three parts and vertically divided into three parts, whereas an object in a right image is disposed at a position far from intersections where the image is horizontally divided into three parts and vertically divided into three parts. Therefore, according to the rule of thirds, it may be said that the left image has a better composition than the right image.

Figure 4B:
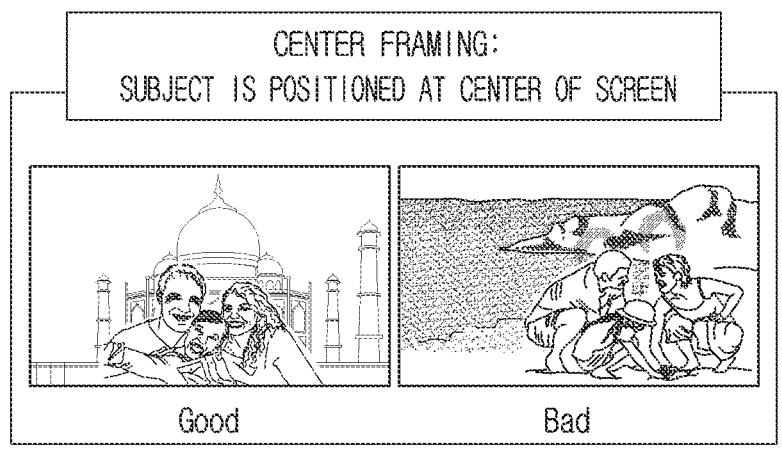

FIG. 4B is a diagram for explaining a rule on whether an object is positioned at a center of an image. Referring to FIG. 4B, an object in a left image is positioned at the center of the image, whereas an object in a right image is away from the center of the image and is deviated to one side. Therefore, according to the rule on whether an object is positioned at the center of an image, it may be said that the left image has a better composition than the right image.

Figure 4C:
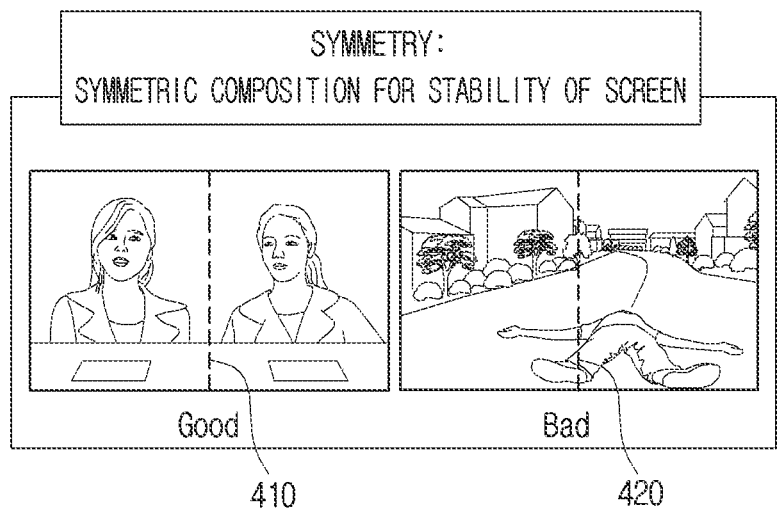

FIG. 4C is a diagram for explaining a rule on symmetry. Referring to FIG. 4C, bilateral symmetry in a left image is high with respect to a dotted line 410 shown along a center of the image, whereas bilateral symmetry in a right image is not high with respect to a dotted line 420 shown along the center of the image. Therefore, according to the rule on symmetry, it may be said that the left image has a better composition than the right image.

Figure 4D:
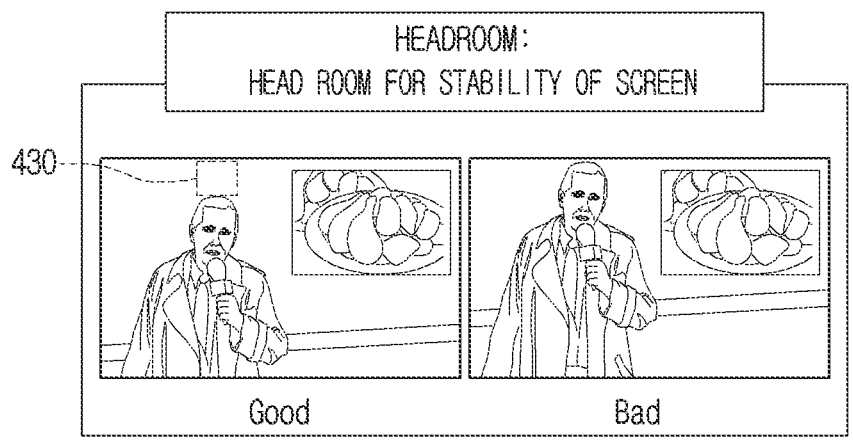

FIG. 4D is a diagram for explaining a rule on head room. Referring to FIG. 4D, in a left image there is a space between a person and an uppermost end of the image (a so-called head room) as much as a space corresponding to a box 430 shown in an image, whereas in a right image there is almost no space between a person and an uppermost end of the image. Therefore, according to the rule on head room, it may be said that the left image has a better composition than the right image.

Figure 4E:
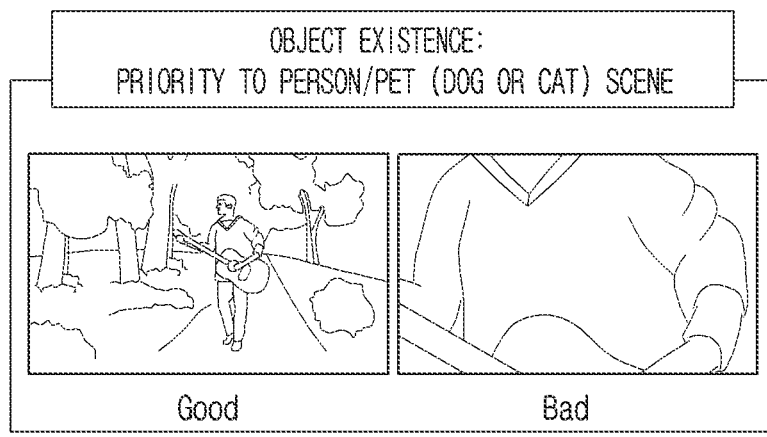

FIG. 4E is a diagram for explaining a rule on object existence. Referring to FIG. 4E, an object in a left image entirely exists in an image, whereas an object in a right image is partially included in the image. Therefore, according to the rule on object existence, it may be said that the left image has a better composition than the right image.

Examples of predefined rules related to whether an object is positioned in a good composition within the image have been described above, but these examples are merely examples that may be applied to the disclosure. Various types of rules capable of evaluating an aesthetic quality for a composition of an image, other than the above-described rules, may be applied to the disclosure. In addition, it may also be set differently, in each of the various embodiments of the disclosure, which rule is to be used among the various types of rules and what weight is to be assigned to each rule. In an embodiment, a process of applying the rules as described above may not only operate based on the rules, but may also be performed through a separate neural network model. Such a separate neural network model may be applied in an integrated form with the first neural network model, the second neural network model, or the third neural network model according to the disclosure.

In another embodiment, all of the score acquired using the aesthetic model 1000, the score acquired using the object detection model 2000-1, and the score acquired using the salient object detection model 2000-2 are scores according to the disclosure, and may be used for identifying a merging section. However, the disclosure is not limited thereto, and a merging section may be identified on the basis of an aggregate score acquired by aggregating the score acquired using the aesthetic model 1000, the score acquired using the object detection model 2000-1, and the score acquired using the salient object detection model 2000-2 as illustrated in FIG. 3. The aggregate score may be calculated by obtaining a sum or an average of the respective scores.

In still another embodiment, the neural network models according to the disclosure are not limited to the first neural network model, the second neural network model, and the third neural network model as described above. The neural network models according to the disclosure may further include an emotion recognition model capable of recognizing a person's emotion by analyzing a person's facial expression. When information acquired through the emotion recognition model indicates that a person included in an image has a happy emotion, the electronic device may acquire a score by applying the predefined rule according to the disclosure while focusing on the person having a happy emotion.

Figure 5:
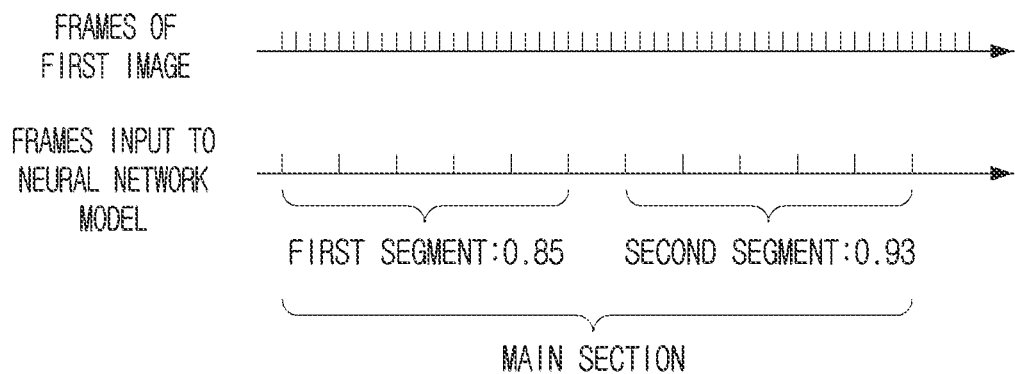
FIG. 5 is a diagram for specifically explaining a process of identifying a main section according to an embodiment of the disclosure.

FIG. 5 is a diagram for specifically explaining a process of identifying a main section according to an embodiment of the disclosure. In an embodiment, FIG. 5 is also a diagram for explaining operation S240 of FIG. 2 in more detail, like FIGS. 3, and 4A to 4E. However, while FIGS. 3, and 4A to 4E relate to a process of acquiring a score for each of a plurality of frames included in an image, FIG. 5 relates to a process of identifying a main section of the image based on acquiring a score for each of the plurality of frames.

FIG. 5 illustrates a plurality of frames included in a first image and a plurality of frames input to a neural network model among a plurality of frames included in the first image.

The electronic device 100 may input a plurality of frames included in the first image to the neural network model at preset frame intervals and acquire a score for each of the input frames. As illustrated in FIG. 5, the electronic device 100 may input a plurality of frames included in the first image to the neural network model at four-frame intervals and acquire a score for each of the input frames.

When acquiring the score for each of the input frames, the electronic device 100 may identify each of sets of a preset number of consecutive frames among the plurality of input frames as a segment. For example, like a first segment and a second segment in FIG. 5, each of the segments may be a set of six consecutive frames among the plurality of frames input to the neural network model.

In an embodiment, when identifying the plurality of segments included in the first image, the electronic device 100 may acquire an average score for each of the segments by calculating an average value of scores for frames included in each of the plurality of segments. For example, when the scores for the six frames included in the first segment of FIG. 5 are 0.85, 0.80, 0.82, 0.85, 0.88, and 0.90, respectively, the electronic device 100 may identify the average score for the first segment as 0.85. Similarly, when the scores for the six frames included in the second segment of FIG. 5 are 0.94, 0.93, 0.92, 0.93, 0.96, and 0.90, respectively, the electronic device 100 may identify the average score for the second segment as 0.93.

The electronic device 100 may identify a set of consecutive segments each having an average score equal to or greater than a preset threshold value as a main section. For example, when the preset threshold value is 0.8, the electronic device 100 may identify, as a main section, a set of the first segment and the second segment of FIG. 5, which are consecutive segments and have average scores of 0.85 and 0.93, respectively. In another embodiment, the electronic device 100 may identify, as a main section, only a section in which a preset number or more of segments each having an average score equal to or greater than the preset threshold value are consecutive.

As can be seen from the main section identifying process as described above, each segment has a fixed size according to the preset number of frames, whereas each main section may have a variable size depending on how many segments each having an average score equal to or greater than the preset threshold value are consecutive. In yet another embodiment, the number of main sections in a specific image may vary depending on how many sets of segments each having an average score equal to or greater than the preset threshold value are consecutive, and there may be no main section in a specific image if there is no segment having an average score equal to or greater than the preset threshold value.

Figure 6:
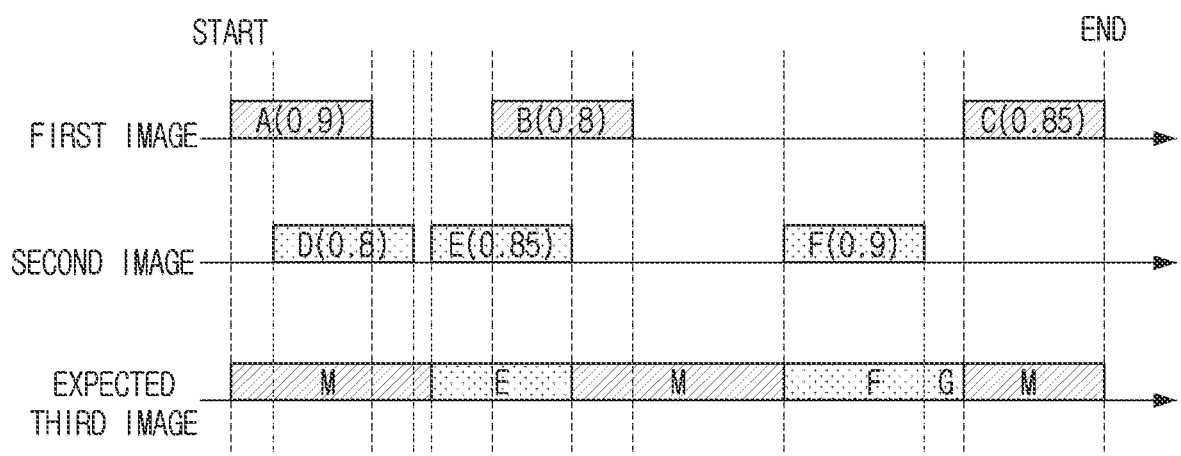
FIG. 6 is a diagram for specifically describing a process of identifying a merging section according to an embodiment of the disclosure.

FIG. 6 is a diagram for specifically describing a process of identifying a merging section according to an embodiment of the disclosure. That is, FIG. 6 is a diagram for explaining operation S260 of FIG. 2 in more detail.

FIG. 6 illustrates a main section of a first image, a main section of a second image, and an entire section of an expected third image. In an embodiment, "the entire section of the expected third image" does not refer to a section of an actual third image generated by merging an image corresponding to a merging section into the first image, but refers to a result of calculating an entire section of a third image by the electronic device 100 prior to requesting the external device 200 for image data corresponding to the merging section.

Referring to FIG. 6, main sections of a first image acquired by an electronic device 100 may include section A, section B, and section C, and the main sections of the second image acquired by an external device 200 may include section D, section E, and section F. In addition, a score of the section A may be 0.9, a score of the section B may be 0.8, a score of the section C may be 0.85, a score of the section D may be 0.7, a score of the section E may be 0.85, and a score of the section F may be 0.9.

On the premise that a time of the first image and a time of the second image are synchronized with each other, vertical lines illustrated in FIG. 6 indicate a start time point and an end time point of each of the main sections of the first image and a start time point and an end time point of each of the main sections of the second image. The start time point and the end time point of each of the main sections of the first image and the start time point and the end time point of each of the main sections of the second image may be identified on the basis of the first time information for the first image and the second time information for the second image, respectively, as described above.

First, the electronic device 100 may identify sections overlapping main sections of the first image among the main sections of the second image, on the basis of the first time information for the start time point and the end time point of each of the main sections of the first image and the second time information for the start time point and the end time point of each of the main sections of the second image. In the example of FIG. 6, the electronic device 100 may identify the section A among the main sections of the first image as overlapping the section D among the main sections of the second image, and identify the section B of the main sections of the first image as overlapping the section E among the main sections of the second image.

In an embodiment, when identifying the sections overlapping the main sections of the first image among the main sections of the second image, the electronic device 100 may identify, as at least one merging section to be merged into the first image, a section overlapping a main section of the first image and having a higher score than the main section of the first image among the main sections of the second image, and a section that does not overlap the main sections of the first image among the main sections of the second image. In the example of FIG. 6, since the score of the section A is 0.9 and the score of the section D is 0.7, the section D of the second image may be identified as a section that is not to be merged into the first image. On the other hand, since the score of the section B is 0.8 and the score of the section E is 0.85, the section E of the second image may be identified as a section that is to be merged into the first image. Since the section F among the main sections of the second image does not overlap any of the sections A, B, and C, which are the main sections of the first image, the section F may also be identified as a section that is to be merged into the first image.

In another embodiment, the process of identifying at least one merging section to be merged into the first image among the main sections of the second image has been described above, but a section other than the main sections of the second image may also be included in the merging sections according to an embodiment of the disclosure. For example, when a section between the section F of the second image, which is identified as a merging section, and the section C of the first image is smaller than a preset threshold length, the electronic device 100 may generate a third image in which section G following the section F in the second image is additionally included in the merging sections.

In still another embodiment, when identifying the merging sections as described above, the electronic device 100 may transmit a request for image data corresponding to the identified merging sections to the external device 200. When receiving image data corresponding to the merging sections from the external device 200 in response thereto, the electronic device 100 may acquire a third image by merging images corresponding to the merging sections into the first image.

In the above-described example, the electronic device 100 may transmit a request for image data corresponding to the sections E and F to the external device 200. Then, when receiving image data corresponding to the sections E and F from the external device 200 in response thereto, the electronic device 100 acquires a third image by merging images corresponding to the sections E and F into the first image. If the section G is added to the merging sections as described above, the electronic device 100 may transmit a request for image data corresponding to the sections E, F, and G to the external device 200, receive image data corresponding to the sections E, F, and G, and generate a third image in which the sections E, F, and G are merged into the first image.

Figure 7A:
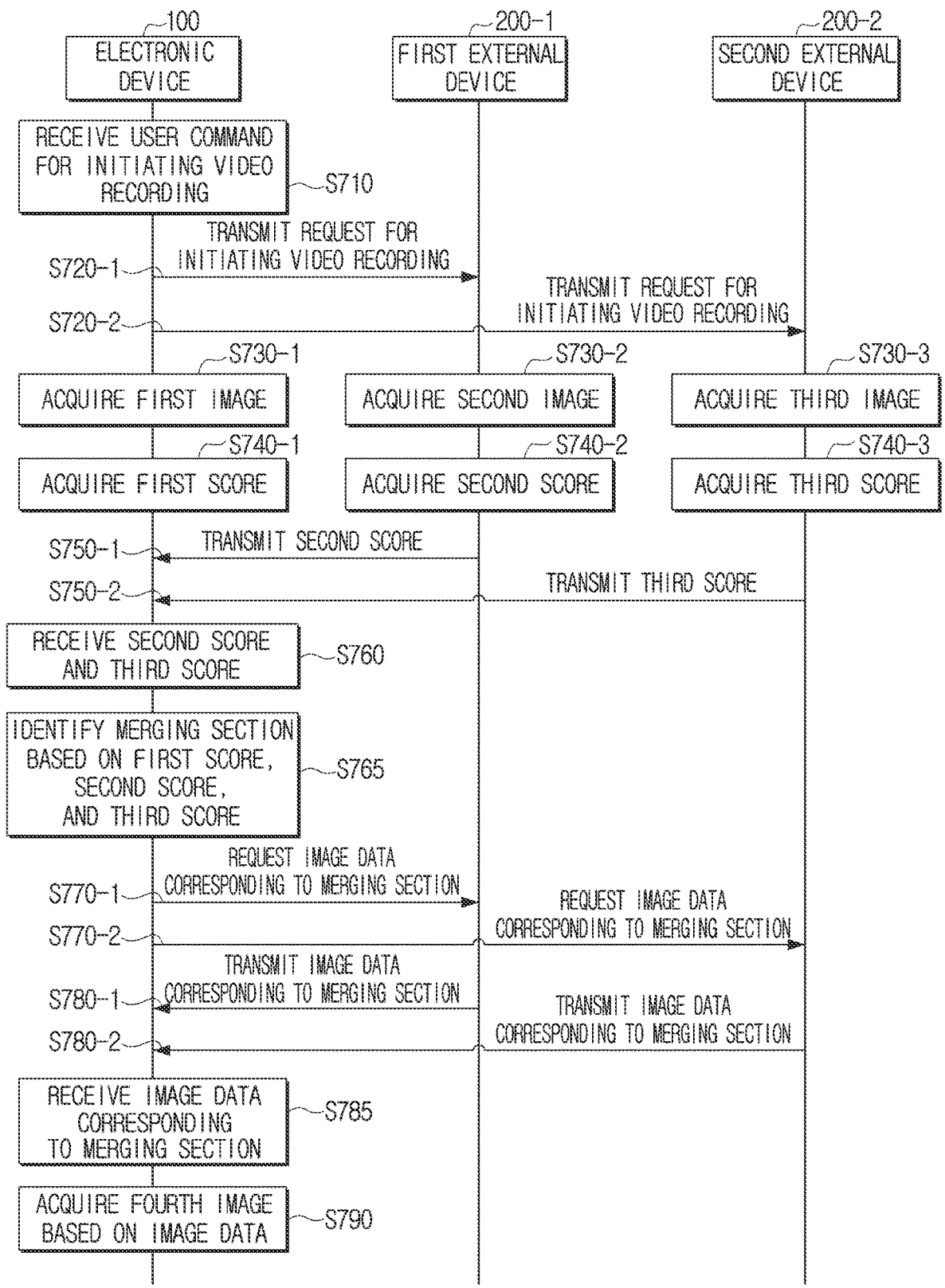
FIGS. 7A and 7B are sequence diagrams for explaining embodiments each for a case in which there are a plurality of external devices according to various embodiments of the disclosure.
Figure 7B:
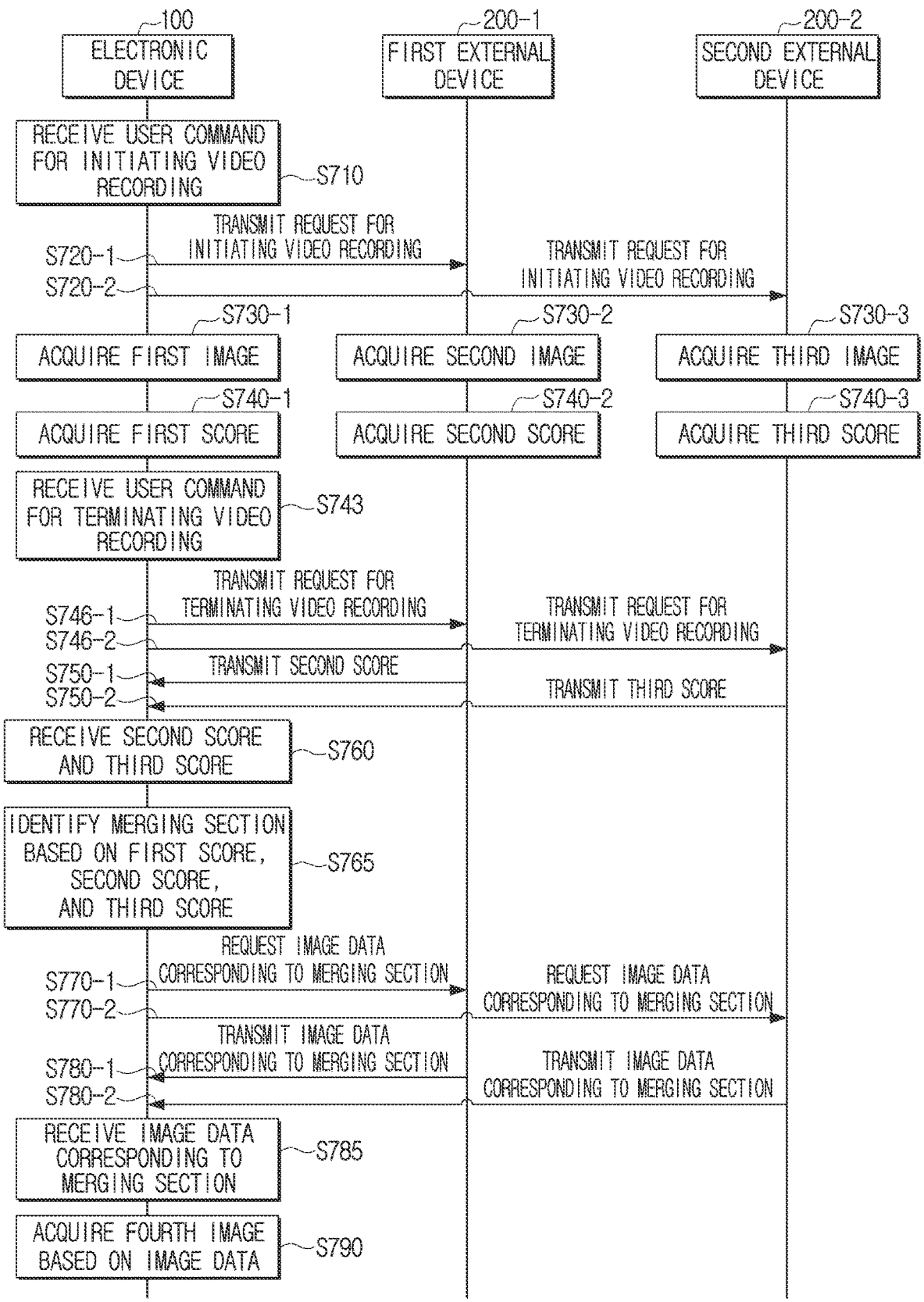
Figure 8:
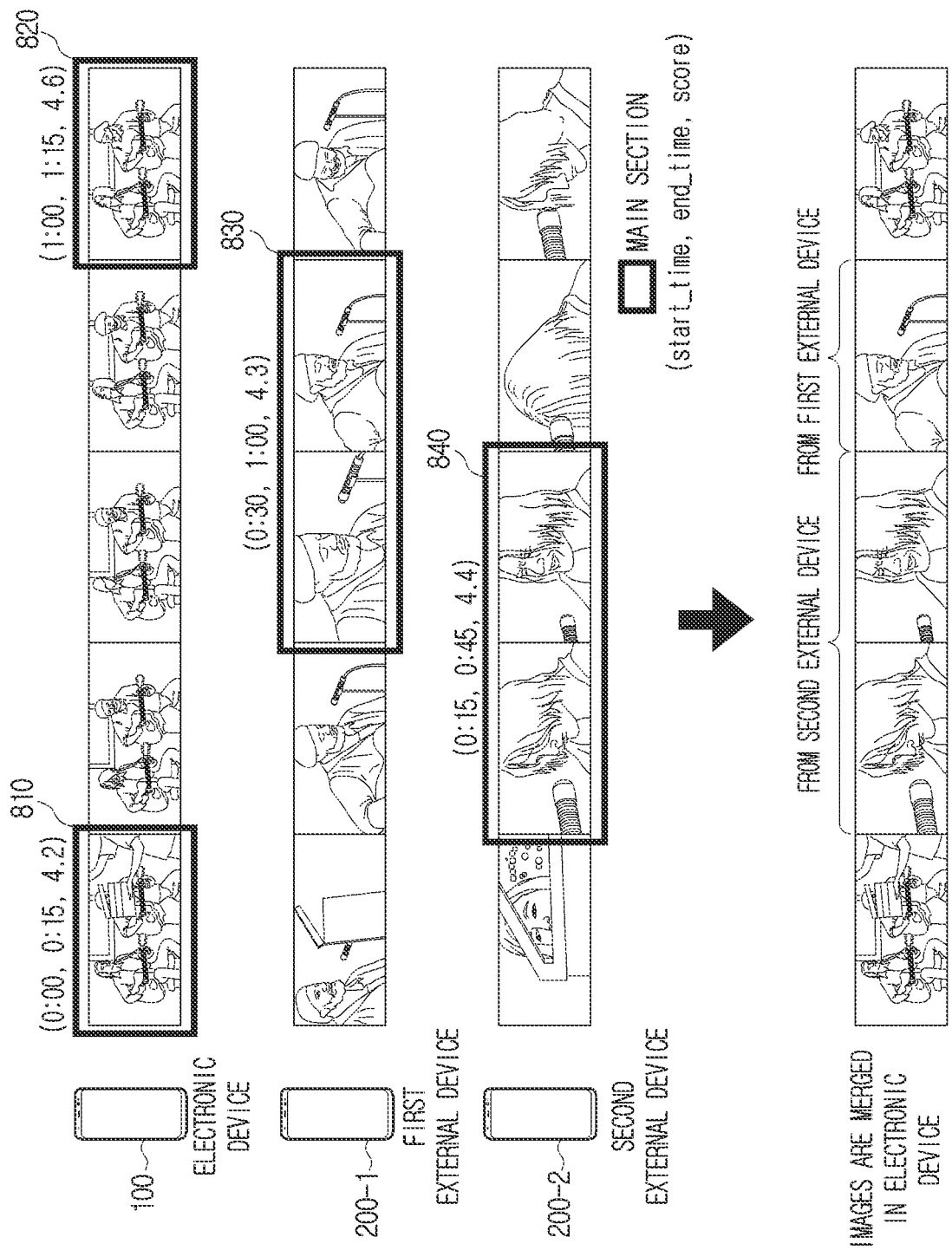
FIG. 8 is a diagram for specifically explaining a merging process in a case where there is a plurality of external devices according to an embodiment of the disclosure.

FIGS. 7A and 7B are sequence diagrams for explaining embodiments each for a case in which there are a plurality of external devices 200 according to various embodiment of the disclosure. FIG. 8 is a diagram for specifically explaining a merging process in a case where there are a plurality of external devices 200 according to an embodiment of the disclosure.

Various embodiments of the disclosure have been described above with reference to FIGS. 1 to 3, 4A to 4E, 5, and 6, on the premise that the electronic device 100 is connected to one external device 200, but the disclosure may be applied even when the electronic device 100 and a plurality of external devices 200-1 and 200-2 are connected to each other to acquire images of different compositions for the same scene, respectively. Hereinafter, the description for what is the same as described above with reference to FIGS. 1 to 3, 4A to 4E, 5, and 6 will not be repeated. For convenience of description, only in the description of FIGS. 7A, 7B and 8, the term "third image" is used to refer to an image acquired by the second external device 200-2.

Specifically, as illustrated in FIG. 7A, an electronic device 100 may receive a user command for initiating video recording in operation S710. When receiving the user command for initiating video recording, the electronic device 100 may transmit a request for initiating video recording to each of a first external device 200-1 and a second external device 200-2 in operations S720-1 and S720-2.

In an embodiment, the electronic device 100 may acquire a first image through a camera according to the received user command in operation S730-1. When receiving the user command for initiating video recording, the electronic device 100 may not only transmit a request for initiating video recording to each of the first external device 200-1 and the second external device 200-2, but also acquire a first image by initiating video recording through the camera of the electronic device 100.

The first external device 200-1 may acquire a second image through a camera included in the first external device 200-1 upon receiving the request for initiating video recording from the electronic device 100 in operation S730-2, and the second external device 200-2 may acquire a third image through a camera included in the second external device 200-2 upon receiving the request for initiating video recording from the electronic device 100 in operation S730-3. In an embodiment, the first image, the second image, and the third image may be simultaneously acquired by the electronic device 100, the first external device 200-1, and the second external device 200-2, respectively.

In another embodiment, when acquiring the first image, the electronic device 100 may acquire a first score related to a composition of the first image using a neural network model included in the electronic device 100 in operation S740-1. In addition, when acquiring the second image, the first external device 200-1 may acquire a second score related to a composition of the second image using a neural network model included in the first external device 200-1 in operation S740-2. Also, when acquiring the third image, the second external device 200-2 may acquire a third score related to a composition of the third image using a neural network model included in the second external device 200-2 in operation S740-3.

In yet another embodiment, when acquiring the second score and the third score, the first external device 200-1 and the second external device 200-2 may transmit the second score and the third score, respectively, to the electronic device 100 in operations S750-1 and S750-2, and the electronic device 100 may receive the second score and the third score from the first external device 200-1 and the second external device 200-2, respectively in operation S760.

In still another embodiment, when receiving the second score and the third score, the electronic device 100 may identify at least one merging section to be merged into the first image from each of the second image and the third image in operation S765.

Specifically, the electronic device 100, the electronic device 100 may identify overlapping sections between main sections of the first image, main sections of the second image, and main sections of the third image by comparing the main sections of the first image, the main sections of the second image, and the main sections of the third image, on the basis of first time information on a start time point and an end time point of each of the main sections of the first image, second time information on a start time point and an end time point of each of the main sections of the second image, and third time information on a start time point and an end time point of each of the main sections of the third image.

In an embodiment, when identifying the overlapping sections between the main sections of the first image, the main sections of the second image, and the main sections of the third image, the electronic device 100 may identify, as at least one merging section to be merged into the first image, a section overlapping at least one of a main section of the first image and a main section of the third image and having a higher score than the at least one overlapping section among the main sections of the second image, a section overlapping at least one of a main section of the first image and a main section of the second image and having a higher score than the at least one overlapping section among the main sections of the third image, a section that does not overlap the main sections of the first image and the main sections of the third image among the main sections of the second image, and a section that does not overlap the main sections of the first image and the main sections of the second image among the main sections of the third image.

Referring to FIG. 8, among main sections 810 and 820 of a first image, a main section 830 of a second image, and a main section 840 of a third image, an electronic device 100 may identify the main section 830 of the second image and the main section 840 of the third image as overlapping each other. In addition, when a score for the main section 830 of the second image is 4.3 and a score for the main section 840 of the third image is 4.4, an electronic device 100 may identify the main section 840 of the third image, which is a section having a higher score, as a merging section to be merged into the first image. At this time, as illustrated in FIG. 8, a section of "0:45 to 1:00" in the main section 830 of the second image, which is a section that does not overlap the main section 840 of the third image, may also be identified as a merging section to be merged into the first image.

In another embodiment, when identifying the merging section as described above, the electronic device 100 may transmit a request for image data corresponding to the merging section to at least one external device 200 of the first external device 200-1 and the second external device 200-2 in operations S770-1 and S770-2. Accordingly, at least one external device 200 of the first external device 200-1 and the second external device 200-2 may transmit image data corresponding to the merging section to the electronic device 100 in operations S780-1 and S780-2.

When receiving the image data corresponding to the merging section from at least one external device 200 of the first external device 200-1 and the second external device 200-2 in operation S785, the electronic device 100 may acquire a fourth image in which an image corresponding to the merging section is merged into the first image on the basis of the received image data in operation S790.

As described with reference to FIG. 7A, according to an embodiment of the disclosure, all of the above-described steps may be performed based on a single user command for initiating video recording, and at least a part of the step of acquiring the fourth image may be performed in real time while the first image, the second image, and the third image are acquired. However, the disclosure is not limited thereto, and at least some of the above-described steps may be performed based on a user command for terminating video recording received after the user command for initiating video recording is received.

Specifically, as illustrated in FIG. 7B, when the electronic device 100 transmits a request for initiating video recording to each of the first external device 200-1 and the second external device 200-2 according to a user command for initiating video recording, the first external device 200-1 and the second external device 200-2 may perform steps of acquiring a second image and a third image in operations S730-2 and S730-3, and acquiring a second score and a third score in operations S740-2 and S740-3 according to the request for initiating video recording. Thereafter, when the electronic device 100 receives a user command for terminating video recording in operation S743, and accordingly, the electronic device 100 transmits a request for terminating video recording to each of the first external device 200-1 and the second external device 200-2 in operations S746-1 and S746-2, the first external device 200-1 and the second external device 200-2 may perform steps of transmitting a second score and a third score, respectively, to the electronic device 100 according to the request for terminating video recording in operations S750-1 and S750-2. Then, when receiving the second score and the third score from the first external device 200-1 and the second external device 200-2, respectively in operation S760, the electronic device 100 may perform a step of identifying a merging section in operation S765, a step of transmitting a request for image data corresponding to the merging section in operations S770-1 and S770-2, a step of receiving image data corresponding to the merging section in operation S785, and a step of acquiring a fourth image in which an image corresponding to the merging section is merged into the first image in operation S790 as illustrated with reference to FIG. 7A.

Figure 9:
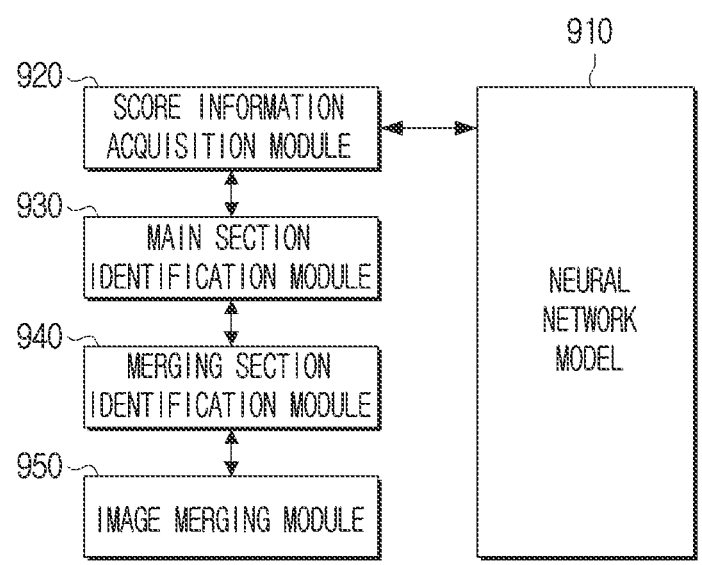
FIG. 9 is a diagram illustrating architectures of software modules according to an embodiment of the disclosure.

FIG. 9 is a diagram illustrating architectures of software modules according to an embodiment of the disclosure.

In an embodiment, a neural network model 910 may be used in acquiring a score according to the disclosure. Specifically, as described above, the neural network model 910 according to the disclosure may include a first neural network model 910 trained to output a score for a composition of an image, a second neural network model 910 trained to output information on a position of an object included in an image, or a third neural network model 910 trained to output information on a position of an object included in an image together with information on the type of object. Since the neural network model 910 has been described in detail with reference to FIGS. 2 and 3, the description thereof will not be repeated.

In another embodiment, a score acquisition module 920 may acquire a score related to a composition of an image. Specifically, the score acquire module 920 may acquire a score through the first neural network model 910, or acquire a score on the basis of a predefined rule related to whether an object is positioned in a good composition within the image when acquiring information on the position of the object through the second neural network model 910 or the third neural network model 910.

In yet another embodiment, a main section identification module 930 may identify a main section according to the disclosure. Specifically, the main section identification module 930 may input a plurality of frames included in an image to the neural network model 910 at preset frame intervals, and acquire a score for each of the input frames. When acquiring the score for each of the input frames, the main section identification module 930 may identify each of sets of a preset number of consecutive frames among the plurality of input frames as a segment. When identifying the plurality of segments included in the image, the main section identification module 930 may acquire an average score for each of the segments by calculating an average value of scores for frames included in each of the plurality of segments. Furthermore, the main section identification module 930 may identify a set of consecutive segments each having an average score equal to or greater than a preset threshold value as a main section.

The main section identification module 930 may store a score for the identified main section and time information on a start time point and an end time point of the main section in a mapped manner on the identified main section.

In an embodiment, a merging section identification module 940 may identify a merging section to be merged into the first image by comparing the main sections of the plurality of images with each other. The merging section identification module 940 may identify sections overlapping main sections of the first image among the main sections of the second image, on the basis of the first time information for the start time point and the end time point of each of the main sections of the first image and the second time information for the start time point and the end time point of each of the main sections of the second image.

In another embodiment, when identifying the sections overlapping the main sections of the first image among the main sections of the second image, the merging section identification module 940 may identify, as at least one merging section to be merged into the first image, a section overlapping a main section of the first image and having a higher score than the main section of the first image among the main sections of the second image, and a section that does not overlap the main sections of the first image among the main sections of the second image.

In yet another embodiment, an image merging module 950 may merge an image corresponding to the identified merging section into the first image. Specifically, the image merging module 950 may generate a third image in which the image corresponding to the merging section is merged into the first image, by inserting the image corresponding to the merging section into a section of the first image corresponding to the merging section.

In addition, the image merging module 950 may not only simply merge an image corresponding to at least one merging section into the first image, but also apply a fade-in or fade-out effect or the like to a boundary section between the first image and the image merged into the first image.

In an embodiment, only image data may be used during acquiring a score through the neural network model 910 and the score acquisition module 920, and identifying a main section and a merging section through the main section identification module 930 and the merging section identification module 940, whereas audio data corresponding to the first image may be used while the image merging module 950 merges an image corresponding to the identified merging section into the first image to create a final image.

In another embodiment, although the software modules of the electronic device have been described above, the external device may also include a neural network model 910, a score acquisition module 920, and a main section identification module 930 according to the disclosure, but may not include a merging section identification module 940 and an image merging module 950.

Figure 10:
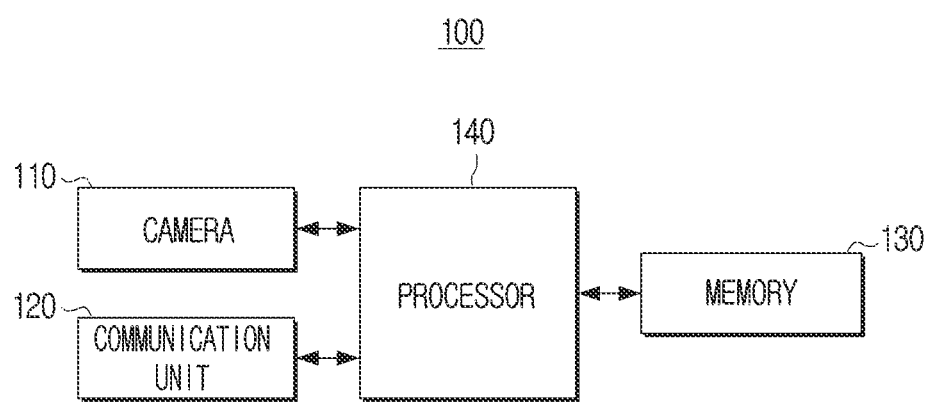
FIG. 10 is a block diagram illustrating a hardware configuration of the electronic device according to an embodiment of the disclosure.

FIG. 10 is a block diagram illustrating a hardware configuration of the electronic device 100 according to an embodiment of the disclosure.

Referring to FIG. 10, an electronic device 100 according to an embodiment of the disclosure includes a camera 110, a communication unit 120, a memory 130, and a processor 140. However, such components are —, and new components may be included in addition to such components, or some of such components may be omitted, when the disclosure is carried out.

In an embodiment, the camera 110 may perform video recording for an object or a scene. Specifically, the camera 110 includes an image sensor, and the image sensor may convert light incident through a lens into an electrical image signal. Then, the processor 140 may acquire an image including the object or the scene through the camera 110. In another embodiment, the disclosure may be implemented with a plurality of cameras 110 and a plurality of image sensors included in the cameras 110.

In particular, in various embodiments according to the disclosure, when receiving a user command for initiating video recording, the processor 140 may transmit a control signal corresponding to the received user command to the camera 110, and accordingly, the camera (110) may initiate video recording. Also, when receiving a user command for terminating video recording, the processor 140 may transmit a control signal corresponding to the received user command to the camera 110, and accordingly, the camera 110 may terminate video recording.

In an embodiment, the communication unit 120 includes a circuit, and may communicate with a server or the external device 200. Specifically, the processor 140 may receive various types of data or information from the server or the external device 200 connected thereto through the communication unit 120, and may also transmit various types of data or information to the server or the external device 200.

In another embodiment, the communication unit 120 may include at least one of a Wi-Fi module, a Bluetooth module, a wireless communication module, or a near-field communication (NFC) module. Specifically, the Wi-Fi module and the Bluetooth module may perform communication in a Wi-Fi mode and in a Bluetooth mode, respectively. In a case where the Wi-Fi module or the Bluetooth module is used, various types of connection information, such as a service set identifier (SSID), may be first transmitted and received, and then various types of information may be transmitted and received after communication connection using the connection information.

In addition, the wireless communication module may perform communication according to various communication standards such as Institute of Electrical and Electronics Engineers (IEEE), Zigbee, 3rd generation (3G), 3rd generation partnership project (3GPP), long term evolution (LTE), and 5th generation (5G). In addition, the NFC module may perform communications in an NFC mode using a band of 13.56 MHz among various RF-ID frequency bands such as 135 kHz, 13.56 MHz, 433 MHz, 860 to 960 MHz, and 2.45 GHz.

In particular, in various embodiments according to the disclosure, the processor 140 may control the communication unit 120 to transmit a first signal including a request for initiating video recording to the external device 200 connected to the electronic device 100. Then, the processor 140 may receive a second signal including a second score related to a composition of a second image acquired by the external device 200 from the external device 200 through the communication unit 120. In addition, the processor 140 may control the communication unit 120 to transmit a third signal including a request for image data corresponding to at least one identified merging section to the external device 200. Furthermore, the processor 140 may receive a fourth signal including the image data corresponding to the at least one merging section from the external device 200 through the communication unit 120. In another embodiment, the processor 140 may also receive a control signal transmitted by a remote control device (e.g., a remote controller or a smartphone) for controlling the electronic device 100 through the communication unit 120.

The memory 130 may be configured to store at least one command related to the electronic device 100. Also, the memory 130 may store an operating system (O/S) for driving the electronic device 100. Furthermore, the memory 130 may store various software programs or applications for operating the electronic device 100 according to various embodiments of the disclosure. In addition, the memory 130 may include a semiconductor memory such as a flash memory, a magnetic storage medium such as a hard disk, or the like.

Specifically, various software modules for operating the electronic device 100 may be stored in the memory 130 according to various embodiments of the disclosure, and the processor 140 may control the operation of the electronic device 100 by executing the various software modules stored in the memory 130. The memory 130 may be accessed by the processor 140, and data in the memory 130 may be read, written, modified, deleted, or updated by the processor 140.

In the disclosure, the term "memory 130" may be used to include a memory 130, a read-only memory (ROM) (not shown) in the processor 140, a random-access memory (RAM) (not shown), or a memory card (not shown) (e.g., a micro secure digital (SD) card or a memory stick) mounted on the electronic device 100.

In particular, in various embodiments according to the disclosure, the memory 130 may store information on a first image acquired through the camera 110, a first score for a composition of the first image, a second score received from the external device 200, image data received from the external device 200, a third image in which a merging section is merged into the first image, etc. In addition, various types of information necessary within the scope for achieving the object of the disclosure may be stored in the memory 130, and the information stored in the memory 130 may be received from a server or the external device 200, or updated according to a user's input.

The processor 140 controls an overall operation of the electronic device 100. Specifically, the processor 140 is connected to the above-described components of the electronic device 100 including the camera 110, the communication unit 120, and the memory 130, and may control the overall operation of the electronic device 100 by executing at least one instruction stored in the memory 130 as described above.

The processor 140 may be implemented in various ways. In an example, the processor 140 may be implemented by at least one of an application specific integrated circuit (ASIC), an embedded processor, a microprocessor, a hardware control logic, a hardware finite state machine (FSM), or a digital signal processor (DSP). In the disclosure, the term "processor 140" may be used to include a central processing unit (CPU), a graphic processing unit (GPU), a main processing unit (MPU), or the like.

In particular, in various embodiments according to the disclosure, the processor 140 may perform a step of acquiring a first image, a step of acquiring a first score, a step of identifying a main section of the first image, a step of identifying a merging section, a step of merging an image, etc. according to the disclosure. In particular, the processor 140 may: when a user command for initiating video recording is received, control the communication unit 120 to transmit a first signal including a request for initiating video recording to the external device 200 connected to the electronic device 100; acquire a first image through the camera 110 according to the user command; acquire a first score for a composition of the first image using a trained neural network model; when a second signal including a second score for a composition of a second image acquired by the external device 200 is received from the external device 200 through the communication unit 120 according to the first signal, identify at least one merging section to be merged into the first image from the second image on the basis of the first score and the second score; control the communication unit 120 to transmit a third signal including a request for image data corresponding to the at least one merging section to the external device 200; and when a fourth signal including the image data is received from the external device 200 through the communication unit 120 according to the third signal, acquire a third image by merging an image corresponding to the at least one merging section into the first image on the basis of the image data. Since the various embodiments according to the disclosure based on the control of the processor 140 have been described above with reference to FIGS. 1 to 3, 4A to 4E, 5, 6, 7A, 7B, 8, and 9, the description thereof will not be repeated.

In addition to the above-described components, the electronic device 100 may further include an output unit including a display displaying the acquired first or third image, a speaker outputting a sound corresponding to the displayed image, and the like. In addition, the electronic device 100 may further include an input unit for controlling a user command for initiating and terminating recording and an image to be displayed. In particular, the user command may be received in a voice signal form through the microphone.

In an embodiment, the control method of the electronic device 100 according to the above-described embodiment may be implemented as a program and, the program may be provided to the electronic device 100. In particular, the program including the control method of the electronic device 100 may be stored in a non-transitory computer-readable medium for provision.

Specifically, in the computer-readable recording medium including the program for executing the control method of the electronic device 100, the control method of the electronic device 100 may include the following steps: when a user command for initiating video recording is received, transmitting a first signal including a request for initiating video recording to the external device 200 connected to the electronic device 100; acquiring a first image according to the user command; acquiring a first score for a composition of the first image using a trained neural network model; when a second signal including a second score for a composition of a second image acquired by the external device 200 according to the first signal is received, identifying at least one merging section to be merged into the first image from the second image on the basis of the first score and the second score; transmitting a third signal including a request for image data corresponding to the at least one merging section to the external device 200; and when a fourth signal including the image data is received according to the third signal, acquiring a third image by merging an image corresponding to the at least one merging section into the first image on the basis of the image data.

The non-transitory readable medium refers to a medium that stores data semi-permanently and that is machine-readable, rather than a medium that stores data for a short moment, such as a register, a cache, or the memory 130. Specifically, the above-described various applications or programs may be stored in a non-transitory readable medium, such as a CD, a DVD, a hard disk, a Blu-ray disk, a USB, a memory (130) card, or a ROM, for provision.

Although the control method of the electronic device 100 and the computer-readable recording medium including the program for executing the control method of the electronic device 100 have been briefly described above, this is merely for omitting redundant description thereof, and the various embodiments of the electronic device 100 may also be applied to the control method of the electronic device 100 and the computer-readable recording medium including the program for executing the control method of the electronic device 100.

According to various embodiments of the disclosure as described above, the electronic device 100 is capable of acquiring a new image by automatically merging sections having good compositions from a plurality of images captured by a plurality of devices, thereby providing significant user convenience accordingly.

In particular, in a case where the neural network models according to the disclosure are implemented in an on-device form, scores for compositions of a plurality of recorded images may be acquired using the respective neural network models included in the electronic device 100 and the external device 200, and the plurality of images may be merged based thereon, without having to transmit the images to an external server. According to the disclosure, security related to user privacy may be secured together with user convenience.

Furthermore, according to the disclosure, since an image is merged by receiving image data corresponding to only a merging section identified by the electronic device 100 from the external device 200, rather than merging an image by receiving image data corresponding to the entire second image from the external device 200, it is possible to significantly reduce a time required for transmitting or receiving an image between the plurality of devices.

Furthermore, according to the disclosure, since an image is merged by receiving image data corresponding to only a merging section identified by the electronic device 100 from the external device 200, rather than merging an image by receiving image data corresponding to the entire second image from the external device 200, it is possible to efficiently transmit or receive an image between the plurality of devices and efficiently use a storage space.

In another embodiment, the functions related to the neural network models (artificial intelligence models) as described above may be performed through the memory 130 and the processor 140.

The processor 140 may include one or more processors 140. At this time, one or more processors 140 may be general-purpose processors such as CPUs or APs, graphics-only processors such as GPUs or VPUs, or artificial intelligence-only processors such as NPUs.

The one or more processors 140 control input data to be processed in accordance with a predefined operating rule or an artificial intelligence model stored in the non-volatile memory 130 and the volatile memory 130. The predefined operating rule or the artificial intelligence model is made through learning.

Being made through learning means that a predefined operating rule or an artificial intelligence model is made with desired characteristics by applying a learning algorithm to a plurality of learning data. The learning may be implemented in a device itself where artificial intelligence is performed according to the disclosure, or may be implemented through a separate server or system.

The artificial intelligence model may include a plurality of neural network layers. Each of the layers has a plurality of weight values, and performs calculations by applying the plurality of weight values to calculation results of a previous layer.

Examples of neural networks include a convolutional neural network (CNN), a deep neural network (DNN), a recurrent neural network (RNN), a restricted Boltzmann machine (RBM), a deep belief network (DBN), a bidirectional recurrent deep neural network (BRDNN), a generative adversarial network (GAN), and a deep Q-network, and the neural networks in the disclosure are not limited to the above-described examples, unless specified herein.

The learning algorithm is a method for training a predetermined target device (e.g., a robot) using a plurality of learning data to enable the predetermined target device to make a determination or a prediction by itself. Examples of learning algorithms include supervised learning, unsupervised learning, semi-supervised learning, and reinforcement learning, and the learning algorithms in the disclosure are not limited to the above-described examples, unless specified herein.

The machine-readable storage medium may be provided in the form of a non-transitory storage medium. The "non-transitory storage medium" simply means that the storage medium is a tangible device, and does not include a signal (e.g., an electromagnetic wave), but this term does not differentiate between where data is semi-permanently stored in the storage medium and where data is temporarily stored in the storage medium. In an example, the "non-transitory storage medium" may include a buffer in which data is temporarily stored.

According to an embodiment, a method according to various embodiments disclosed herein may be included in a computer program product for provision. The computer program product may be traded as a commodity between a seller and a buyer. The computer program product may be distributed in the form of a machine-readable storage medium (e.g., a compact disc read only memory (CD-ROM)), or distributed (e.g., downloaded or uploaded) online via an application store (e.g., PlayStore™) or between two user devices (e.g., smartphones) directly. In a case where the computer program product is distributed online, at least part of the computer program product (e.g., a downloadable application) may be at least temporarily stored or temporarily generated in a machine-readable storage medium, such as a memory 130 of a manufacturer's server, an application store's server, or a relay server.

Each of the above-described components (e.g., modules or programs) according to various embodiments of the disclosure may include a single entity or a plurality of entities, and some of the above-described sub-components may be omitted, or other sub-components may be further included in the various embodiments. Alternatively or additionally, some components (e.g., modules or programs) may be integrated into one entity to perform the same or similar functions performed by the respective components prior to the integration.

The operations performed by the modules, the programs, or other components according to various embodiments may be executed sequentially, in parallel, repetitively, or heuristically. Or, at least some of the operations may be executed in a different order or omitted, or other operations may be added.

The term "unit" or "module" used in the disclosure includes a unit configured as hardware, software, or firmware, and may be used interchangeably with the term "logic", "logical block", "part", "circuit", or the like. The "unit" or "module" may be an integrally formed element or a minimum unit for performing one or more functions or a part thereof. In an example, the module may be configured as an application-specific integrated circuit (ASIC).

Various embodiments of the disclosure may be implemented as software including instructions stored in a machine-readable storage medium (e.g., a computer-readable storage medium). The machine is a device capable of calling a stored instruction from the storage medium and operating according to the called instruction, and may include an electronic device (e.g., the electronic device 100) according to embodiments disclosed herein.

In a case where the instruction is executed by the processor 140, a function corresponding to the instruction may be performed either directly by the processor 140 or using other components under the control of the processor 140. The instruction may include a code generated or executed by a compiler or an interpreter.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device, comprising:
a camera;
a communication unit including a circuit;
memory storing one or more computer programs; and
one or more processors communicatively coupled to the camera. the communication unit, and the memory,
wherein the one or more computer programs include computer-executable instructions that, when executed by the one or more processors, cause the electronic device to:
when a user command for initiating video recording is received, control the communication unit to transmit a first signal including a request for initiating video recording to an external device connected to the electronic device,
acquire a first image through the camera according to the user command,
acquire a first score for a composition of the first image using a trained neural network model,
when a second signal including a second score for a composition of a second image acquired by the external device is received from the external device through the communication unit according to the first signal, identify at least one merging section to be merged into the first image from the second image on a basis of the first score and the second score,
control the communication unit to transmit a third signal including a request for image data corresponding to the at least one merging section to the external device, and
when a fourth signal including the image data is received from the external device through the communication unit according to the third signal, acquire a third image by merging an image corresponding to the at least one merging section into the first image on a basis of the image data.

2. The electronic device of claim 1,
wherein the first score is an average value of scores for at least some of a plurality of frames included in a main section of the first image,
wherein the main section of the first image is at least one of a plurality of sections of the first image in which an average value of scores for at least some frames included in each of the plurality of sections is equal to or greater than a preset threshold value,
wherein the second score is an average value of scores for at least some of a plurality of frames included in a main section of the second image, and
wherein the main section of the second image is at least one of a plurality of sections of the second image in which an average value of scores for at least some frames included in each of the plurality of sections is equal to or greater than the preset threshold value.

3. The electronic device of claim 1, wherein the one or more computer programs further include computer-executable instructions that, when executed by the one or more processors, cause the electronic device to:
acquire first time information on a start time point and an end time point of each of main sections of the first image, on a basis of the first time information and second time information on a start time point and an end time point of each of main sections of the second image included in the second signal, identify a section overlapping a main section of the first image among the main sections of the second image, and identify, as the at least one merging section, a section overlapping a main section of the first image and having a higher score than the main section of the first image among the main sections of the second image, and a section that does not overlap the main sections of the first image among the main sections of the second image.

4. The electronic device of claim 1, wherein the one or more computer programs further include computer-executable instructions that, when executed by the one or more processors, cause the electronic device to:

while a plurality of frames of the first image are acquired, input at least some of the plurality of frames of the first image to the neural network model at a preset frame interval; and acquire scores for the at least some of the plurality of frames of the first image.

5. The electronic device of claim 1, wherein the request for initiating video recording includes time code information for synchronizing system times of the electronic device and the external device with each other.

6. The electronic device of claim 1, wherein the second score is received from the external device through the communication unit as a fifth signal including a request for terminating the initiated video recording is transmitted to the external device through the communication unit.

7. The electronic device of claim 1, wherein the second score is acquired using a neural network model included in the external device.

8. A control method performed by an electronic device, the control method comprising:

when a user command for initiating video recording is received, transmitting a first signal including a request for initiating video recording to an external device connected to the electronic device;

acquiring a first image according to the user command;

acquiring a first score for a composition of the first image using a trained neural network model;

when a second signal including a second score for a composition of a second image acquired by the external device is received according to the first signal, identifying at least one merging section to be merged into the first image from the second image on a basis of the first score and the second score;

transmitting a third signal including a request for image data corresponding to the at least one merging section to the external device; and when a fourth signal including the image data is received according to the third signal, acquiring a third image by merging an image corresponding to the at least one merging section into the first image on a basis of the image data.

9. The control method of claim 8, wherein the first score is an average value of scores for at least some of a plurality of frames included in a main section of the first image, wherein the main section of the first image is at least one of a plurality of sections of the first image in which an average value of scores for at least some frames included in each of the plurality of sections is equal to or greater than a preset threshold value, wherein the second score is an average value of scores for at least some of a plurality of frames included in a main section of the second image, and wherein the main section of the second image is at least one of a plurality of sections of the second image in which an average value of scores for at least some frames included in each of the plurality of sections is equal to or greater than the preset threshold value.

10. The control method of claim 8, wherein the identifying of the at least one merging section includes:

acquiring first time information on a start time point and an end time point of each of main sections of the first image;

on a basis of the first time information and second time information on a start time point and an end time point of each of main sections of the second image included in the second signal, identifying a section overlapping a main section of the first image among the main sections of the second image; and identifying, as the at least one merging section, a section overlapping a main section of the first image and having a higher score than the main section of the first image among the main sections of the second image, and a section that does not overlap the main sections of the first image among the main sections of the second image.

11. The control method of claim 8, wherein the acquiring of the first score includes:

while a plurality of frames of the first image are acquired, inputting at least some of the plurality of frames of the first image to the neural network model at a preset frame interval; and acquiring scores for the at least some of the plurality of frames of the first image.

12. The control method of claim 8, wherein the request for initiating video recording includes time code information for synchronizing system times of the electronic device and the external device with each other.

13. The control method of claim 8, wherein the second score is received from the external device as a fifth signal including a request for terminating the initiated video recording is transmitted.

14. The control method of claim 8, wherein the second score is acquired using a neural network model included in the external device.

15. One or more non-transitory computer-readable storage media storing one or more computer programs including computer-executable instructions that, when executed by one or more processors of an electronic device, cause the electronic device to perform operations, the operations comprising:

when a user command for initiating video recording is received, transmitting a first signal including a request for initiating video recording to an external device connected to the electronic device;

acquiring a first image according to the user command;

acquiring a first score for a composition of the first image using a trained neural network model;

when a second signal including a second score for a composition of a second image acquired by the external device is received according to the first signal, identifying at least one merging section to be merged into the first image from the second image on a basis of the first score and the second score;

transmitting a third signal including a request for image data corresponding to the at least one merging section to the external device; and when a fourth signal including the image data is received according to the third signal, acquiring a third image by merging an image corresponding to the at least one merging section into the first image on a basis of the image data.

\* \* \* \* \*